United States Patent
Najmi et al.

(10) Patent No.: US 7,788,119 B2
(45) Date of Patent: Aug. 31, 2010

(54) SYSTEM PROVIDING FOR INVENTORY OPTIMIZATION IN ASSOCIATION WITH A CENTRALLY MANAGED MASTER REPOSITORY FOR CORE REFERENCE DATA ASSOCIATED WITH AN ENTERPRISE

(75) Inventors: Adeel Najmi, Plano, TX (US); Vasudev Rangadass, Arlington, TX (US); Ramesh Raman, San Carlos, CA (US)

(73) Assignee: i2 Technologies US, Inc., Dallas, TX (US)

( * ) Notice: Subject to any disclaimer, the term of this patent is extended or adjusted under 35 U.S.C. 154(b) by 1463 days.

(21) Appl. No.: 10/841,003

(22) Filed: May 7, 2004

(65) Prior Publication Data

US 2005/0004831 A1    Jan. 6, 2005

Related U.S. Application Data

(60) Provisional application No. 60/469,324, filed on May 9, 2003.

(51) Int. Cl.
  G06F 9/44        (2006.01)
  G06F 17/50       (2006.01)
(52) U.S. Cl. .............................. 705/7; 705/8
(58) Field of Classification Search ............ 705/7, 705/8
See application file for complete search history.

(56) References Cited

U.S. PATENT DOCUMENTS

| 5,946,662 | A  | * | 8/1999 | Ettl et al. ...................... 705/8 |
| 6,151,582 | A  | * | 11/2000 | Huang et al. ................... 705/8 |
| 6,643,556 | B1 |   | 11/2003 | Morenz et al. .............. 700/106 |
| 7,346,534 | B1 | * | 3/2008 | Martin et al. ................. 705/9 |
| 7,406,431 | B2 | * | 7/2008 | Spira et al. .................... 705/7 |
| 2006/0200333 | A1 | * | 9/2006 | Dalal et al. .................. 703/17 |

OTHER PUBLICATIONS

U.S. Appl. No. 60/462,210 by Dalal, et al.*

(Continued)

*Primary Examiner*—Beth V. Boswell
*Assistant Examiner*—Mark A Fleischer
(74) *Attorney, Agent, or Firm*—Booth Udall, PLC; Steven J. Laureanti

(57) ABSTRACT

In one embodiment, optimizing inventory for a supply chain includes generating an inventory plan for the supply chains. Execution of a supply chain plan associated with the inventory plan is initiated at the supply chain. The supply chain is monitored to generate metric values. A watchpoint triggered by a metric value is detected, and a cause of the triggered watchpoint is identified using a causal tree. The inventory plan is adjusted in response to the detected triggered watchpoint and in accordance with the identified cause, and the supply chain plan is adjusted in accordance with the adjusted inventory plan. Execution of the adjusted supply chain plan is initiated, and new metric values are measured to determine performance. The performance is evaluated, and the causal tree is updated in response to the evaluation.

23 Claims, 9 Drawing Sheets

OTHER PUBLICATIONS

Jeffrey W Overby, Soonhong Min.; "International supply chain management in an Internet environment: A network-oriented approach to internationalization" International Marketing Review. 2001. vol. 18, Iss. 4; p. 392, 28.*

Smith, Stephen A., *"Optimal Inventories For An (S—1, S) System With No Backorders*"* Management Science, vol. 23, No. 5, Copyright © 1977, The Institute of Management Sciences, pp. 522-528, Jan. 1977.

Wolff, Ronald W., *"Poisson Arrivals See Time Averages"*, Operations Research, vol. 30, No. 2, © 1982 Operations Research Society of America, pp. 223-231, Mar.-Apr. 1982.

Federgruen, Awi, et al., *"An Efficient Algorithm for Computing Optimal (s, S) Policies"*, Operations Research, vol. 32, No. 6, © 1984 Operations Research Society of America, pp. 1268-1285.

Svoronos, Antony, et al., *"Evaluation of One-For-One Replenishment Policies For Multiechelon Inventory Systems*"* Management Science, vol. 37, No. 1, Copyright © 1991, The Institute of Management Sciences, pp. 68-83, Jan. 1991.

*"Improving Service and Market Share with Inventory Optimization; How to improve both your top and bottom lines through superior inventory management"*, White Paper, i2 Technologies, Inc., © Copyright 2003 i2 Technologies, Inc., 32 pages, Sep. 2003.

Johansen, Soren Glud, *"Base-stock policies for the lost sales inventory system with Poisson demand and Erlangian lead times"*, Department of Operations Research, University of Aarhus, Denmark, pp. 1-14, Nov. 19, 2003.

* cited by examiner

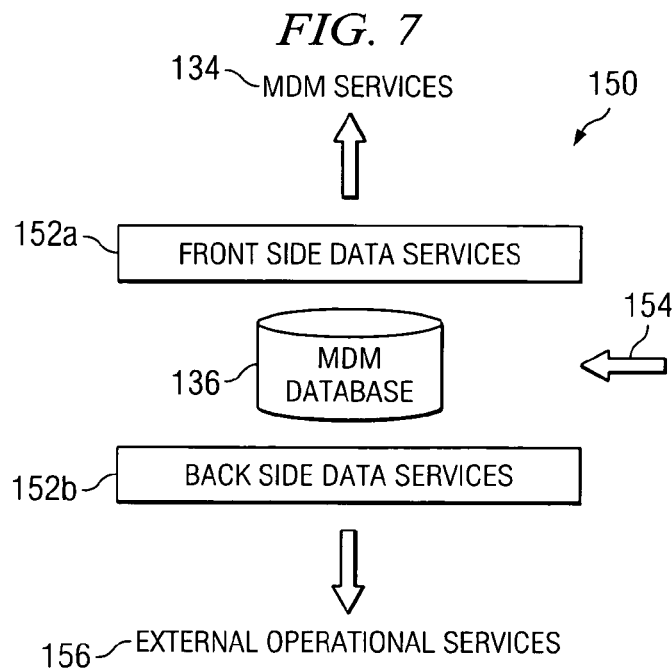
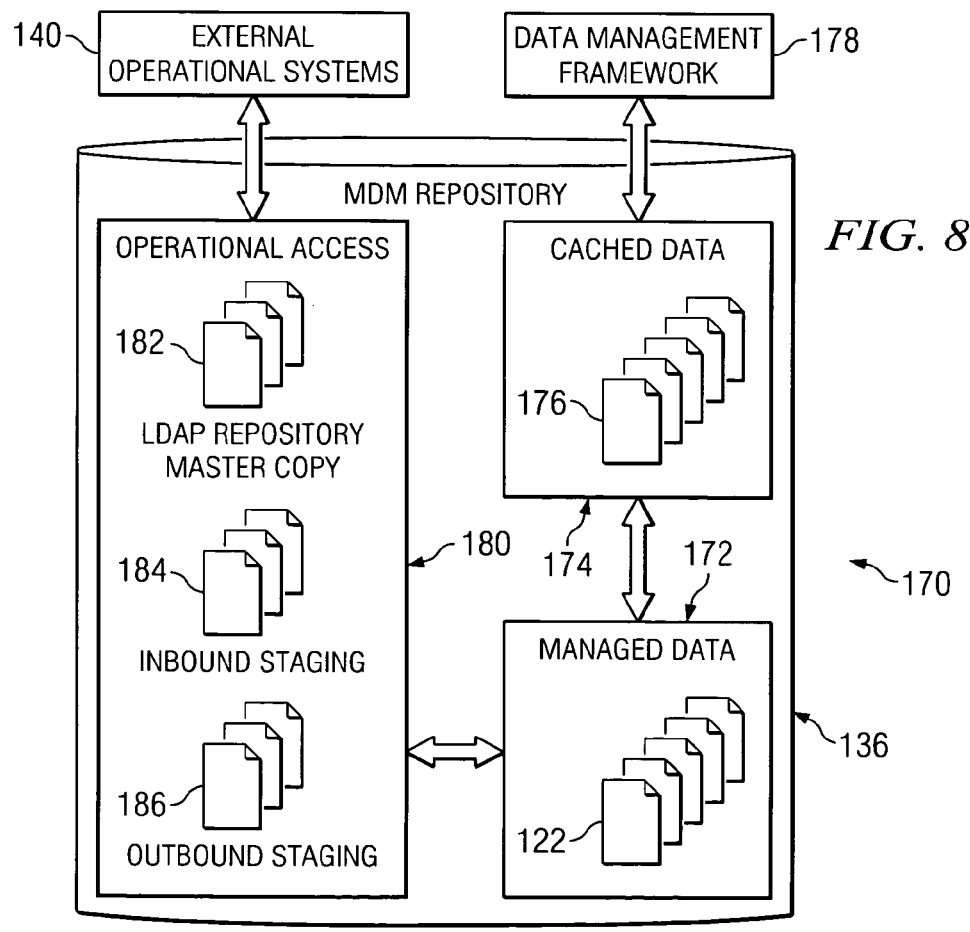

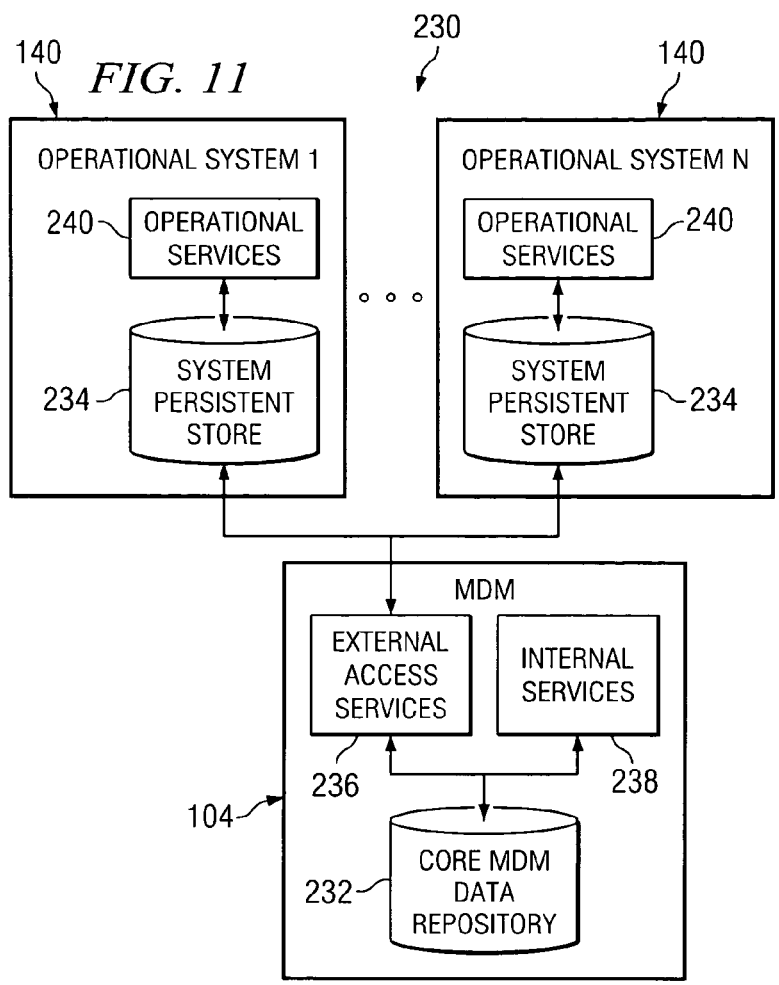
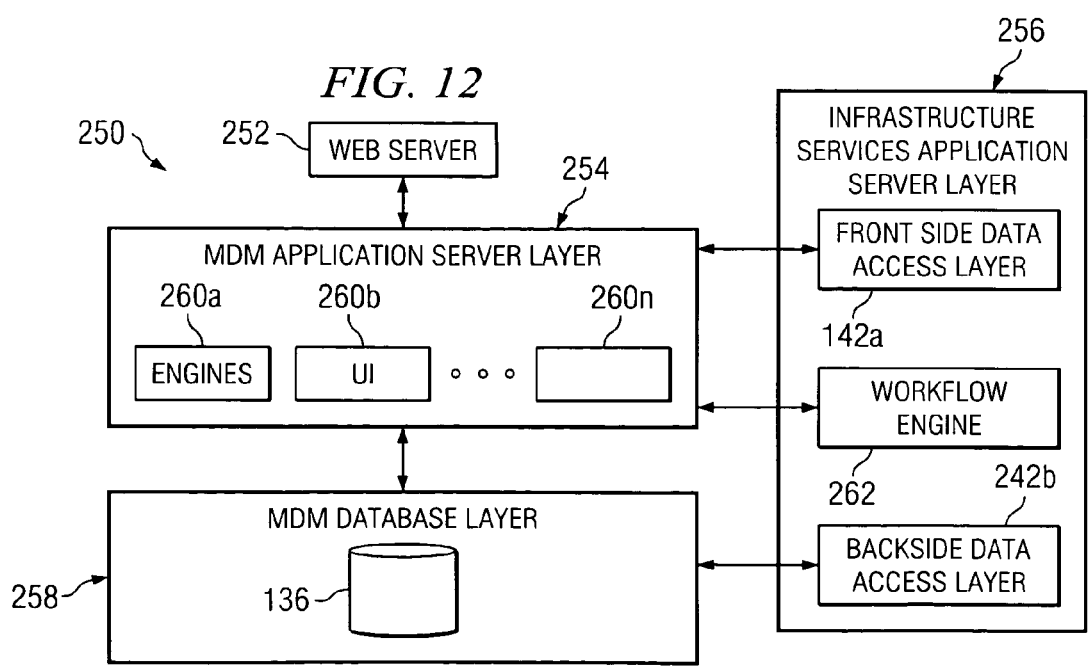

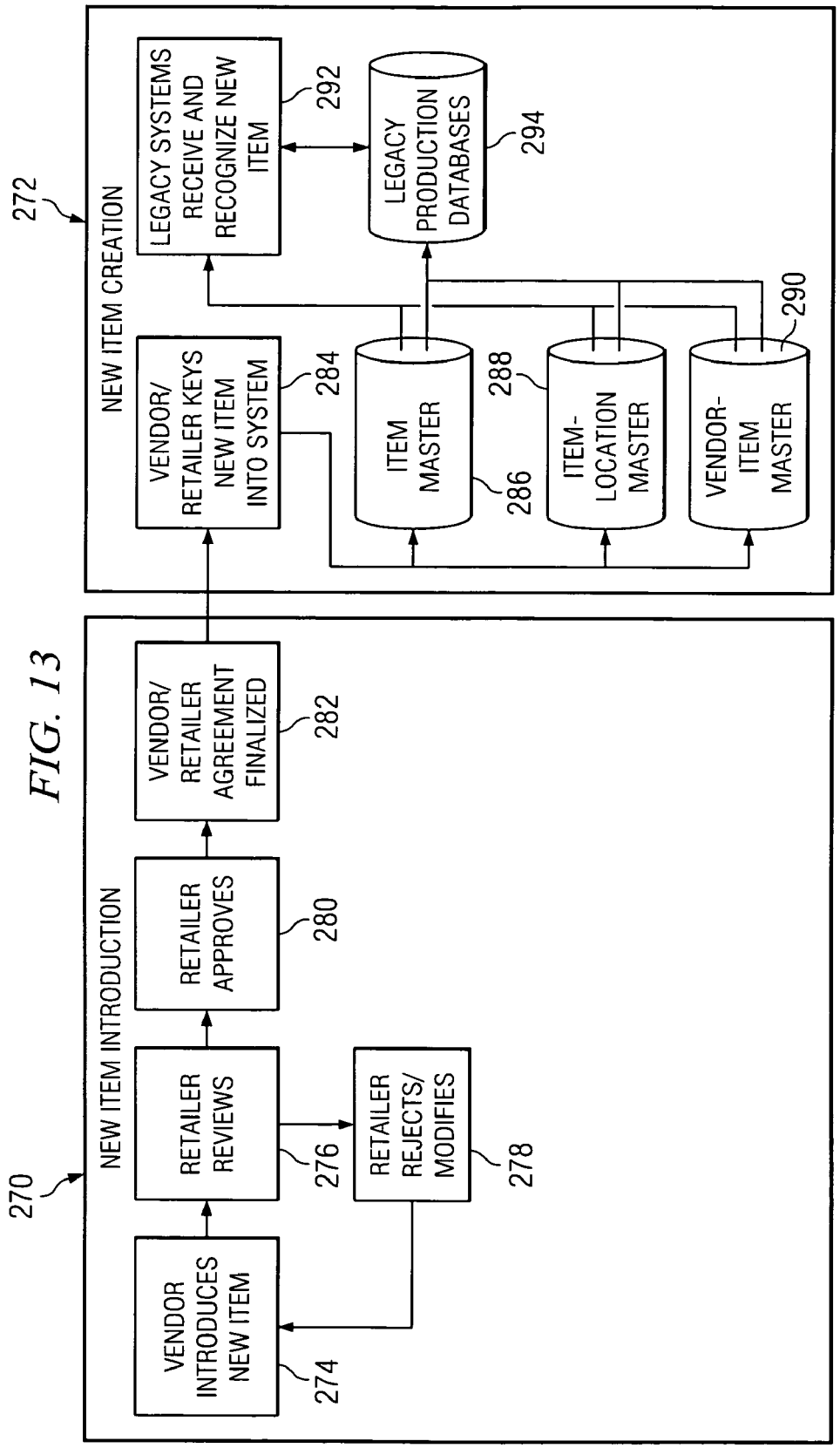

SYSTEM PROVIDING FOR INVENTORY OPTIMIZATION IN ASSOCIATION WITH A CENTRALLY MANAGED MASTER REPOSITORY FOR CORE REFERENCE DATA ASSOCIATED WITH AN ENTERPRISE

RELATED APPLICATION

This application claims benefit under 35 U.S.C. §119(e) of U.S. Provisional Application Ser. No. 60/469,324, entitled "INVENTORY OPTIMIZATION," filed May 9, 2003.

TECHNICAL FIELD

This invention relates generally to enterprise management solutions, and more particularly to a system providing for inventory optimization in association with a centrally managed master repository for core reference data associated with an enterprise.

BACKGROUND

A supply chain receives supplies from suppliers and provides products to customers. A supply chain may include buffers that store inventory used to make the products. The inventory stored at the buffers may be optimized to minimize costs associated with storage while satisfying customer service levels. A problem with inventory optimization is to generate an inventory optimization plan that effectively accounts for changes in a supply chain.

SUMMARY OF THE INVENTION

In one embodiment, optimizing inventory for a supply chain includes generating an inventory plan for the supply chain. Execution of a supply chain plan associated with the inventory plan is initiated at the supply chain. The supply chain is monitored to generate metric values. A watchpoint triggered by a metric value is detected, and a cause of the triggered watchpoint is identified using a causal tree. The inventory plan is adjusted in response to the detected triggered watchpoint and in accordance with the identified cause, and the supply chain plan is adjusted in accordance with the adjusted inventory plan. Execution of the adjusted supply chain plan is initiated, and new metric values are measured to determine performance. The performance is evaluated, and the causal tree is updated in response to the evaluation.

Particular embodiments of the present invention may provide one or more technical advantages. For example, certain embodiments may provide a closed loop process that involves initiating execution of an inventory plan in a supply chain, detecting a problem in the supply chain, identifying a cause of the problem, and adjusting the inventory plan in accordance to the identified cause. Certain embodiments may provide an enterprise solution framework incorporating classification into configuration, planning, execution, and monitoring segments. Certain embodiments may provide a secure system of record optimized in architecture and design for management of core enterprise reference data. Certain embodiments may allow for full or partial automation of important time- and labor-intensive business processes according to embedded enterprise-level business workflows. Certain embodiments may support one or more optimization processes. Certain embodiments of the present invention may provide all, some, or none of these technical advantages. Certain embodiments may provide one or more other technical advantages, one or more of which may be readily apparent to those skilled in the art from the figures, description, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 7 illustrates an example high level logical data services architecture for an MDM system;

FIG. 8 illustrates an example high level logical architecture of an MDM database;

FIG. 11 illustrates an example MDM use model;

FIG. 12 illustrates an example high level physical architecture for an MDM system; and FIG. 13 illustrates an example new item introduction process provided within an MDM system.

DESCRIPTION OF EXAMPLE EMBODIMENTS

I. Example Supply Chain

Figure 1:
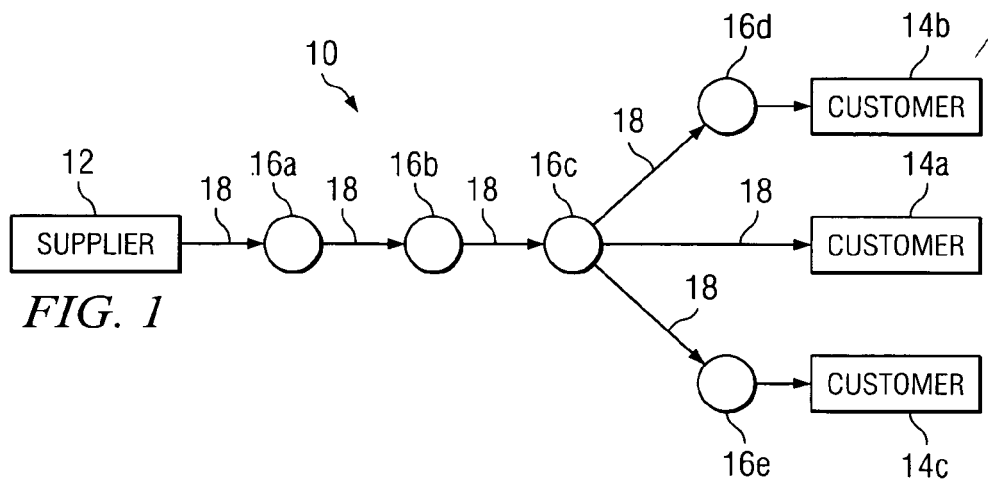
FIG. 1 illustrates an example supply chain that receives supplies from one or more suppliers and provides products to one or more customers.

FIG. 1 illustrates an example supply chain 10 that receives supplies from one or more suppliers 12 and provides products to one or more customers 14. Inventory optimization is used to determine an inventory plan describing an optimized amount of inventory to have at the buffers of supply chain 10. According to one embodiment of the invention, inventory optimization is a closed loop process that involves initiating execution of an inventory plan in a supply chain, detecting a problem in the supply chain, identifying a cause of the problem, and adjusting the inventory plan in accordance to the identified cause.

An entity of supply chain 10 may refer to, for example, an item, a location, a channel, or any combination of the preceding of a supply chain. Items flow through supply chain 10 and may comprise, for example, parts or supplies that may be used to generate products. A location may refer to a node 16 or an arc 18 of supply chain 10. A channel may relate to the nature of a sale to a customer 14. Inventory on hand may refer to items stored at nodes 16 in order to cover demand and to manage supply risk. Other examples of entities may include operations such as manufacturing, routing, transport, or sourcing operations.

In the illustrated example, supplier 12 supplies items to node 16a, which supplies items to node 16b. Node 16b supplies items to node 16c, which provides items to customer 14a and also supplies items to nodes 16d and 16e. Nodes 16d and 16e provide items to customers 14b and 84c, respectively.

Although supply chain 10 is illustrated as having a particular number of suppliers 12, customers 14, nodes 16, and arcs 18, any suitable modifications, additions, or omissions may be made to supply chain 10 without departing from the scope of the invention. For example, supply chain 10 may have more or fewer nodes 16 or arcs 18. As another example, node 16a may supply items to node 16c rather than to node 16b. As another example, node 16b may supply items directly to a customer 14.

The entities of supply chain 10 may be sorted into policy groups in order to determine policy parameters for the entities. The entities may be sorted according to any suitable attribute. For example, the entities may be sorted by item such that each item may be placed into a different policy group. As another example, the entities may be sorted by item and location such that the same items at different locations may be placed in different policy groups. As yet another example, the entities may be sorted by item, location, and channel such that the same items at the same location but associated with different channels may be placed in different policy groups.

Once the entities have been sorted into policy groups, policy parameters of the policy groups may be applied to the entities of the groups. According to one embodiment, the policy parameters may define a service level policy. A service level policy describes the level of service for an entity, and may include a customer service level, a lead time, or other parameter. As an example, segmentation may classify customers into criticality groups, where each criticality group has a specified customer service level. Criticality groups may be used to define different service levels for different customers. According to another embodiment, a policy group may refer to a buying behavior group that includes entities with a common buying behavior. According to another embodiment, a policy group may refer to an order lead time group that that includes entities with a common order lead time.

Certain item-location combinations may be designated as inventory buffers. Inventory buffers may be used to reduce the effects of variability in the supply chain. Variability in the supply chain typically refers to demand variability, supply variability, or both demand variability and supply variability. Inventory optimization is used to determine an inventory plan describing an optimized amount of inventory to have at the buffers of a supply chain. According to one embodiment of the invention, inventory optimization is a closed loop process that involves initiating execution of an inventory plan in a supply chain, detecting a problem in the supply chain, identifying a cause of the problem, and adjusting the inventory plan in accordance to the identified cause. The closed loop process may happen in conjunction with other planning processes such as supply chain planning. The closed loop process may be a continuous cycle with an average cycle time ranging from, for example, one month to six months, depending on the average life cycles of the items of the inventory.

II. System for Optimizing Inventory

Figure 2:
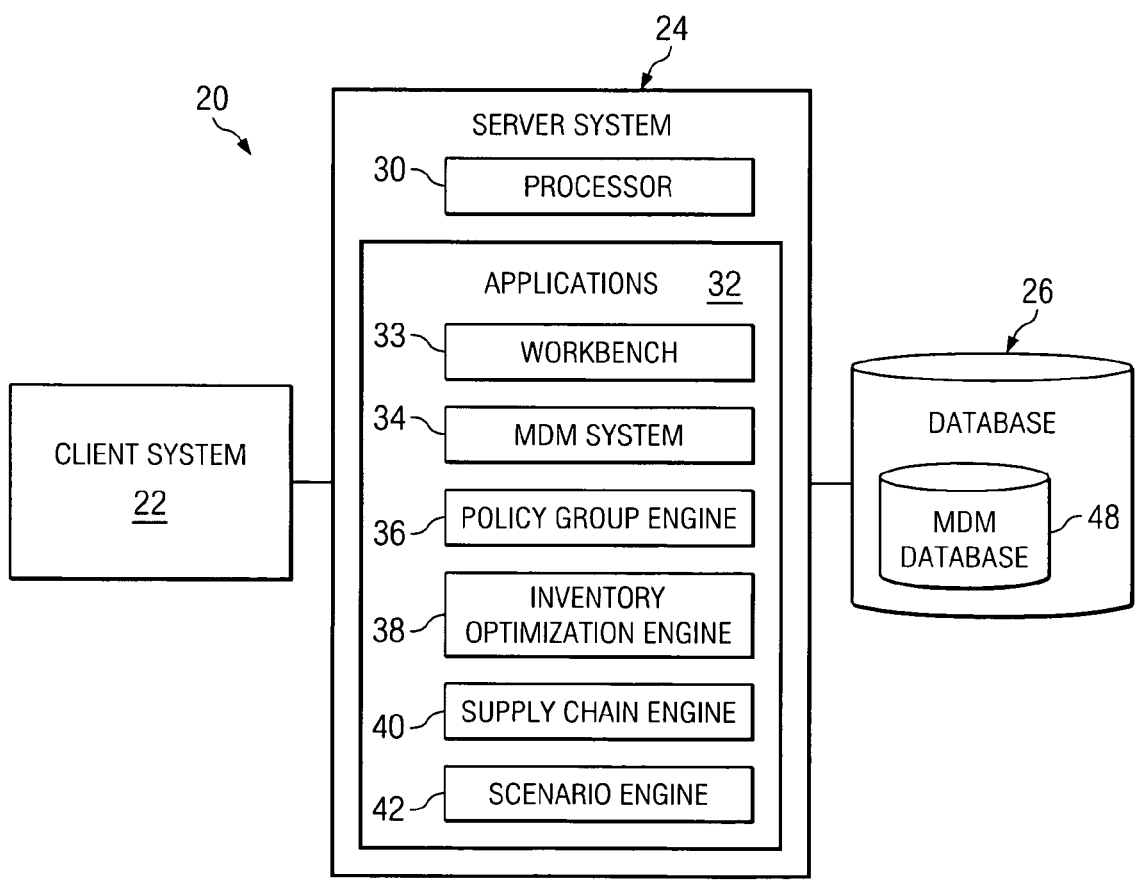
FIG. 2 illustrates an example system for optimizing inventory using a closed loop process.

FIG. 2 illustrates an example system 20 for optimizing inventory of supply chain 10 using a closed loop process. The closed loop process involves initiating execution of an inventory plan in a supply chain, detecting a problem in the supply chain, identifying a cause of the problem, and adjusting the inventory plan in accordance to the identified cause.

According to the illustrated embodiment, system 20 includes a client system 22, a server system 24, and a database 26 coupled as shown in FIG. 1. Client system 22 allows a user to communicate with server system 24 to optimize inventory in supply chain 10 using a closed loop process. Server system 24 manages engines or other applications for optimizing inventory in supply chain 10 using a closed loop process. Database 26 includes any suitable database, memory, or other data storage arrangement that stores data that may be used by server system 24.

According to the illustrated embodiment, server system 24 includes one or more processors 30 and one or more applications 32 coupled as shown in FIG. 1. Processors 30 manage the operation of server system 24, and may comprise any devices operable to accept input, process the input according to predefined rules, and produce an output. In a particular embodiment, processors 30 may comprise parallel processors in a distributed processing environment.

According to the illustrated embodiment, applications 32 include a workbench 33, master data management (MDM) software 34, a policy group engine 36, an inventory optimization engine 38, a supply chain engine 40, and a scenario engine 42. Applications 32 may be configured to execute on processors 30 in any suitable manner. As an example, two or more applications 32 may execute on the same processor 30. As another example, a primary application 32 and its backup application 32 may execute on different processors 30.

Workbench 33 may be used to generate data for supply chain 10, modify parameters of supply chain 10, and create scenarios and reports describing supply chain 10. For example, workbench 33 allows for filtering the entities of supply chain 10 using group data edit parameters to search for entities. Group data edit parameters may include attributes of the entities, and may include time parameters that may be used to specify a data range. Filter settings may be saved, for example, as a bookmark or query. The entities may be filtered multiple times. For example, a first filter may be applied to filter entities, and then a second filter may be applied to the filtered entities. According to one example, if the values or ranges for the parameters of the filters conflict, the values or ranges of the second filter may override the values or ranges of the first filter.

As another example, a group edit may be performed for operations of supply chain 10. For example, the following attributes may be used to edit operations: supply chain cycle time mean, cycle time standard deviation, multiplier factor, computed planning cycle time, released planning cycle time, or any combination of the following. The mean and standard deviation of the cycle times are used as inputs to inventory optimization engine 38 to determine a computed planning cycle time. The multiplier factor is used to update the computed planning cycle time. The computed planning cycle time may be updated as the sum of the mean and the product of the multiplier factor and the standard deviation. The released planning cycle time is what is in use or will be used for supply chain planning. When the released planning cycle time changes, the computed value is copied over the released planning cycle time and to be rippled in the next planning run.

MDM software 34 supports business processes for configuring and re-configuring an enterprise. Any suitable process may be supported, such as business data management or other types of management business processes. Master data management refers to the process flows and parameters around managing the life-cycle of business entities such as items, vendors, resources, sites, organization, customers, planning hierarchies, enterprise calendars, or any combination of the preceding. Supply chain configuration data management refers to the process flows and parameters around managing the life-cycle of business entities such as operations, routings, bills of resources, bills of materials, bills of distribution, buffers, channels, or any combination of the preceding. Business data synchronization refers to the processes that are used to synchronize enterprise business data with trading partners.

Optimization business processes may also be supported. Network optimization refers to configuring the optimal manufacturing and distribution network. Flow path optimization refers to configuring the optimal flow policy for different products in the network. Inventory optimization refers to configuring the location and amount of the inventory response buffers in the manufacturing and distribution network considering constraints. Sourcing optimization refers to configuring the optimal, such as the most responsive, lowest cost, or most flexible, supplier network considering constraints. Transport sourcing optimization refers to configuring the optimal carrier base to transport goods over the network. Channel optimization refers to configuring the allocation and priorities of different channels, customers, or both considering profitability and business strategy.

Policy group engine 42 may, alone or in cooperation with one or more other appropriate components of system 10, be used to generate and prioritize policy groups and assign policy parameters to the policy groups. Groups may be manually created using logical and mathematical operators applied to attributes. These groups may be managed as entities in the system with attributes such as group creation date, deletion date, or other attribute. Groups may be automatically created using clustering and segmentation processes.

Inventory optimization engine 38 may, alone or in cooperation with one or more other appropriate components of system 10, generate, inventory plans that optimize the inventory at nodes 16 of supply chain 10. Inventory optimization engine 38 may be built on top of the MDM framework. According to one example, the inventory optimization model may be a subset of the MDM logical model. According to another example, the inventory optimization solution may work with a supply chain manager master planning solution.

Inventory optimization engine 38 may be deployed in any suitable manner, such as a stand-alone solution for inventory optimization or as a part of a complete business configuration management solution including, for example, flow-path optimization and network optimization. Inventory optimization engine 38 may also be deployed with a supply chain manager master planning solution, a factory planning solution, a retail replenishment and allocation solution, a retail merchandise planning solution, or a spare parts planning solution.

Supply chain engine 40 may, alone or in cooperation with one or more other appropriate components of system 10, generate a supply chain plan for supply chain 10, implement the supply chain plan at supply chain 10, and monitor the performance of supply chain 10 under the supply chain plan. A supply chain plan may designate the type and number of items at each location of supply chain 10 at a specific time, and the paths over which the items travel to reach the locations. A supply chain plan may be generated in accordance with an inventory plan to satisfy the optimized amount of inventory at the buffers of supply chain 10.

The performance of supply chain 10 may be monitored by measuring one or more supply chain metrics to obtain metric values. A supply chain metric measures the operation or performance of supply chain 10. A simple example of a supply chain metric is the amount of inventory at a buffer. Other examples of supply chain metrics may include supply-demand performance, customer service level performance, on-time order performance, other suitable measure of supply chain performance, or any combination of the preceding. Other example supply chain metrics may include maximum safety stock, minimum safety stock, beginning on-hand stock, ending on-hand stock, carrying cost, inventory value, forecast surplus, intrinsic quantity, quantity allocated, quantity blocked, stock outs, customer service level, or any combination of the preceding.

Supply chain monitor 40 determines if a metric value has triggered a watchpoint and if the metric value falls with inside or outside of an anticipated variability. A watchpoint refers to a threshold at which an action is taken. For example, reorder level may operate as a threshold. If the inventory at a buffer falls below a reorder level, inventory is reordered for the buffer. A metric value that has triggered a watchpoint may be inside of or outside of anticipated variability. If the value is inside of the anticipated variability, a pre-determined response may be initiated. If the value is outside of the anticipated variability, a particular response may need to be determined.

Scenario engine 42 creates scenarios of supply chain 10. A scenario describes the state of supply chain 10 with respect to time and may be generated from actual or assumed data describing supply chain 10. The scenarios may be generated according to scenario parameters, which may be selected by a user. A scenario parameter refers to a parameter describing the operation or performance of supply chain 10. Example scenario parameters may include order lead time, target customer service level, or other parameter.

A child scenario may be generated from a parent scenario by modifying the parent scenario. The parent scenario may be modified by applying a function F to parent scenario $Scenario_{Parent}$ to generate child scenario $Scenario_{Child}$ according to $F(Scenario_{Parent}) = Scenario_{Child}$. The function F may be regarded as a series of transformations $f_1, f_2, \ldots, f_k$, where each transformation $f_i$ represents an adjustment of a parameter.

Scenario manager also creates snapshots of supply chain 10 at particular times from the scenarios. Certain operations may be performed on snapshots. For example, a child snapshot may be generated from a parent snapshot. Other example operations include accessing or viewing a snapshot, naming a snapshot, merging snapshots, deleting a snapshot, other operation, or any combination of the preceding. Rules may be used to define relationships between operations. For example, if a parent snapshot is deleted, then the child snapshots of the parent snapshot are also deleted. Roles may be assigned to snapshots to define users that may perform certain operations.

Scenarios may be generated to determine how to adjust an inventory plan. Each scenario may be associated with different sets of scenario parameter values. Outcomes for the scenarios may be determined and evaluated. The outcomes may be evaluated according to, for example, inventory levels, customer service levels, transportation cost, warehousing cost, revenue increase, profit function, intangibles, other parameter, or any combination of the preceding. An outcome may be selected in accordance with the evaluation. The inventory plan may be adjusted in accordance with the scenario parameter value set of the identified scenario.

Policy group scenarios may be generated to select policy parameters for entities of supply chain 10. The attributes and policy parameters of a policy group may be expressed as scenario parameters that can be used to generate a policy group scenario for the policy group. Policy group scenarios may be evaluated. A policy group scenario may be selected in accordance with the evaluation, and the policy parameters corresponding to the selected policy group scenario may be selected for entities of supply chain 10.

Database 26 includes an MDM database 48. MDM database 48 may include data used to identify the causes of unanticipated variation of supply chain 10. For example, MDM database 48 may include a knowledge layer. The knowledge layer may record causal information that is learned from adjusting watchpoints and monitoring the results of the adjusted watchpoints.

The knowledge layer may include a causal tree, or a "fishbone," that may be used to identify one or more possible causes of an unanticipated variability. The tree may include an unanticipated variability, or a symptom. The symptom may be linked to one or more root causes. A causal tree may include one or more levels of intermediate causes between the symptom and the root causes. For example, a symptom may be linked to one or more intermediate causes, at least some of which may be linked to a next level intermediate cause or to a root cause. Accordingly, from the symptom, one or more root causes may be identified. MDM database 48 may also include data used to adjust an inventory plan in accordance with a cause of a variation. The data may link the cause with a particular adjustment of the inventory plan that may reduce the variation. For example, a cause may be linked with a watchpoint adjustment.

If the causal tree identifies more than one root cause, learning may be used to narrow down the root causes. A watchpoint may be adjusted according to an identified root cause and the performance may be measured. If the performance improves, then the adjusted watchpoint may be selected to be used. If the performance does not improve, then another adjustment may be made according to another identified root cause. The process is repeated until sufficient performance is achieved. The causal tree may be updated to record the learning.

Client system 22 and server system 24 may each operate on one or more computers and may include appropriate input devices, output devices, mass storage media, processors, memory, or other components for receiving, processing, storing, and communicating information according to the operation of system 20. As used in this document, the term "computer" refers to any suitable device operable to accept input, process the input according to predefined rules, and produce output. Client system 22, server system 24, and database 26 may be integrated or separated according to particular needs. For example, the present invention contemplates the functions of both client system 22 and server system 24 being provided using a single computer system, such as a single personal computer. As another example, database 26 may reside within server system 24. If any combination of client system 22, server system 24, or database 26 are separated, they may be coupled to each other using a local area network (LAN), a metropolitan area network (MAN), a wide area network (WAN), a global computer network such as the Internet, or any other appropriate wireline, optical, wireless, or other link.

According to a particular embodiment, an MDM system may include MDM software 34 and MDM database. An example MDM system is described with reference to FIGS. 4 through 13.

Modifications, additions, or omissions may be made to system 20 without departing from the scope of the invention. For example, fewer or other components may perform the operations of system 20. For example, the operations of inventory optimization engine 38 and supply chain engine 40 may be performed by one component, or the operations of inventory optimization engine 38 may be performed by more than one component. Additionally, functions may be performed using any suitable logic comprising software, hardware, other logic, or any suitable combination of the preceding.

III. Method for Optimizing Inventory

Figure 3:
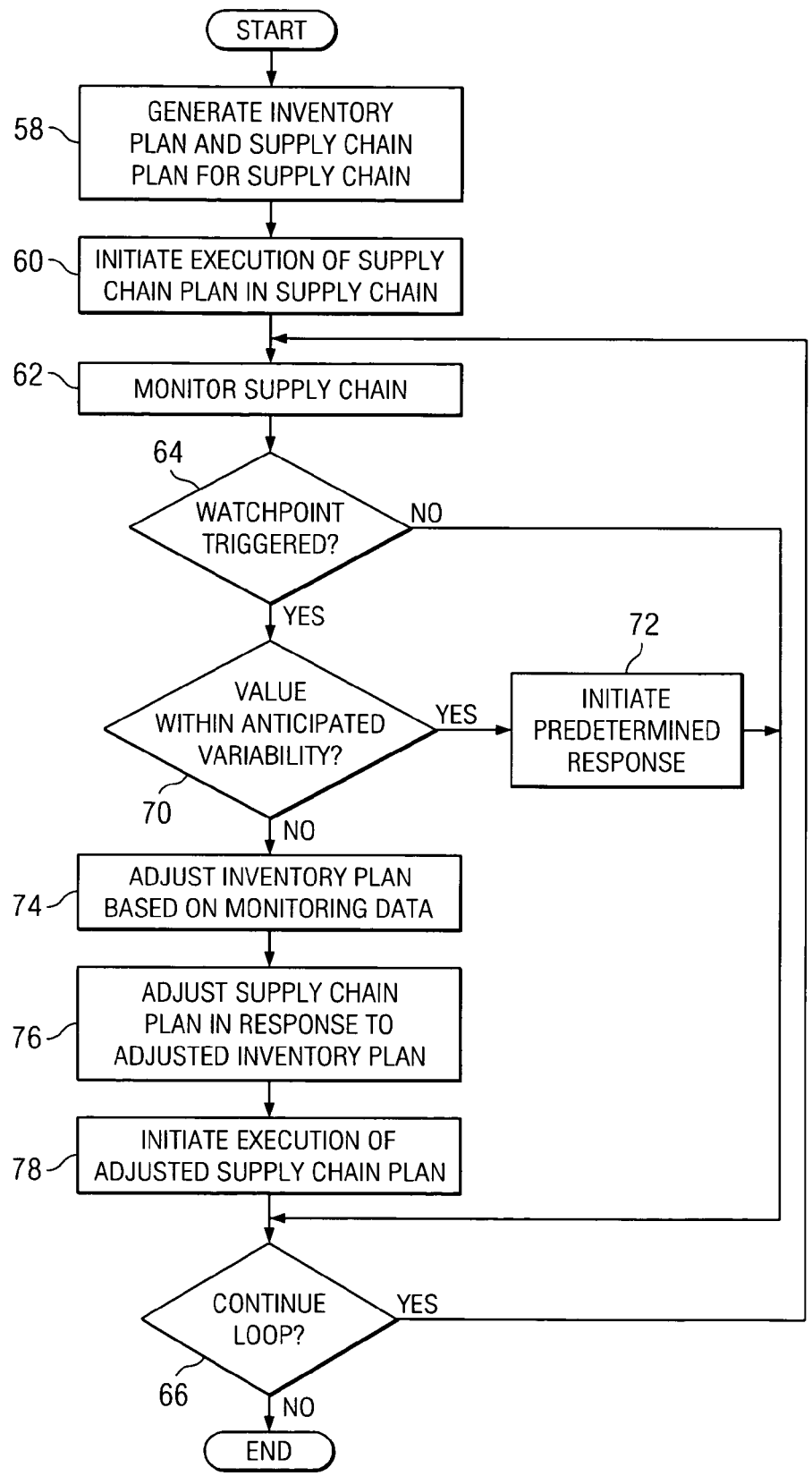
FIG. 3 illustrates an example method for optimizing inventory using a closed loop process.

FIG. 3 illustrates an example method for optimizing inventory using a closed loop process. The method begins at step 58, where an inventory plan and a supply chain plan are generated for supply chain 10. Inventory optimization engine 38 may generate an inventory plan describing an optimized amount of inventory to have at the buffers of supply chain 10. Supply chain engine 40 may generate a supply chain plan that accommodates the optimized inventory. The supply chain plan is implemented in supply chain 10 at step 60.

Supply chain 10 is monitored at step 62. Supply chain monitor 40 may be used to monitor supply chain metrics of supply chain 10. An example supply chain metric may be, for example, a buffer inventory metric that measures the amount of inventory at a buffer. A watchpoint may be triggered at step 64. An example watchpoint may be, for example, a reorder point that may be triggered if the inventory metric value falls below the reorder point. If a watchpoint is not triggered at step 64, the method proceeds to step 66.

If a watchpoint is triggered at step 64, the method proceeds to step 70. The metric value may be inside of or outside of an anticipated variability at step 70. If the metric value is within the anticipated variability, the method proceeds to step 72, where a predetermined response is initiated. For example, if the inventory metric value is within an anticipated variability, a predetermined response may be to order more inventory. The method then proceeds to step 66.

If the metric value that triggered the watchpoint is not within the anticipated variability, the method proceeds to step 74. The inventory plan is adjusted based on the monitoring data at step 74. Inventory optimization engine 38 may adjust the inventory plan by identifying a cause of the variation and determining an adjustment that reduces the variation. The supply chain plan is adjusted in accordance with the adjusted inventory plan at step 76. The adjusted supply chain plan is implemented at step 78. The method then proceeds to step 66.

If the closed loop process is to continue at step 66, the method returns to step 62 to continue to monitor supply chain 10. If the closed loop process is not to continue at step 66, the method terminates.

Modifications, additions, or omissions may be made to the method without departing from the scope of the invention. Additionally, steps may be performed in any suitable order without departing from the scope of the invention.

IV. Enterprise Solution Framework

Figure 4:
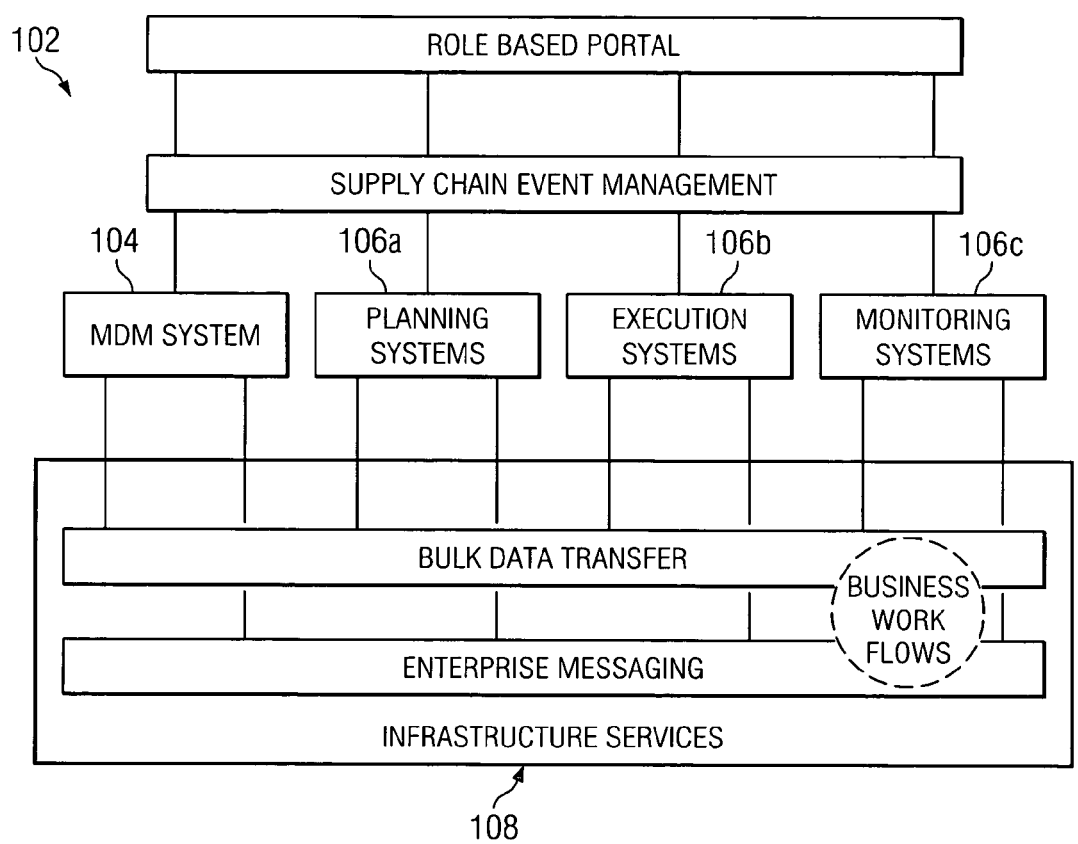
FIG. 4 illustrates an example enterprise solution framework including a master data management (MDM) system.

FIG. 4 illustrates an example enterprise solution framework 102 including a master data management (MDM) system 104. An enterprise may use an MDM product to address management of enterprise data. A considerable amount of data is required to adequately define an enterprise. The data may be of two fundamental types. A first type of data, which may be referred to as core enterprise reference data, describes the structure and characteristics of the enterprise and its entities and is not transient or transactional in nature. This type of data may be associated with enterprise data masters and may be stored in a core MDM reference data repository, although such data is not restricted to the type of data associated with traditional enterprise data masters. Efficient handling this data is critical, as is orderly and process-driven management of the state of the data. Use of this data is, in general, not limited to particular portions of the enterprise; rather, this data is typically used pervasively throughout the enterprise and with its value chain partners. The second type of data, which may be referred to as operational data, is transient transactional data required by planning, execution, monitoring, or other enterprise solution components. This type of data is typically not stored in the core MDM reference data repository; the MDM product provides a staging and distribution framework for such data. MDM system 104 provides for effective and scalable management, distribution, and use of both its core enterprise reference data and its transactional data in a manner that services needs for this data within the enterprise as a whole and also specific needs of planning, execution, monitoring, and other enterprise solution components associated with the enterprise.

In one embodiment, framework 102 includes a classification of an associated enterprise into four fundamental segments: (1) configuration of the enterprise and its entities; (2) planning with respect to the enterprise and its entities; that is, decisions about what to do; (3) execution with respect to the enterprise and its entities; that is, acting upon those decisions; and (4) monitoring with respect to the enterprise and its entities; that is, monitoring the results of those decisions and supplying feedback to the configuration and planning segments accordingly. In this embodiment, MDM system 104 represents the configuration segment, while the planning, execution, and monitoring enterprise solution components 106 represent the planning, execution, and monitoring segments, respectively.

MDM system 104 provides centralized storage and management of enterprise reference data, maintaining reference data and associated data management processes separate from enterprise solution components 106 and associated operational processes while making reference data available to enterprise solution components 106 for consumption as needed. Centralized storage and management of reference data for existing and future enterprise solution components 106 may facilitate extension or other modification of enterprise solution components 106 without needing to modify reference data within MDM system 104. Centralized storage and management of reference data may also facilitate integration of enterprise solution components 106, for example, when one enterprise solution component 106 is replaced with another or an enterprise solution component providing an entirely new business function is introduced. Centralized storage and management of reference data may further facilitate integration of one enterprise into another, for example, in connection with a merger or acquisition.

Infrastructure services 108 provide bulk data transfer and enterprise messaging between MDM and enterprise solution components 106 in accordance with business workflows operating in association with infrastructure services 108. These workflows, which may be embedded partially within MDM system 104 and partially within infrastructure services 108, may incorporate customized business best practices of the enterprise. In addition, these workflows may be wholly or partially automated using an appropriate enterprise-level workflow engine and appropriate MDM resources available to that workflow engine.

In one embodiment, MDM system 104 may support one or more optimization processes, such as network optimization, flow path optimization, inventory optimization, supply sourcing optimization, transport sourcing optimization, channel optimization, or any other suitable optimization, singly or in any suitable combination. Results of one or more such optimizations may be used in generating optimal plans, executing on these plans, monitoring the execution of these plans, and providing feedback based on the monitoring that may be used for reconfiguration, re-planning, and the like.

V. MDM Logical Business Architecture

Figure 5:
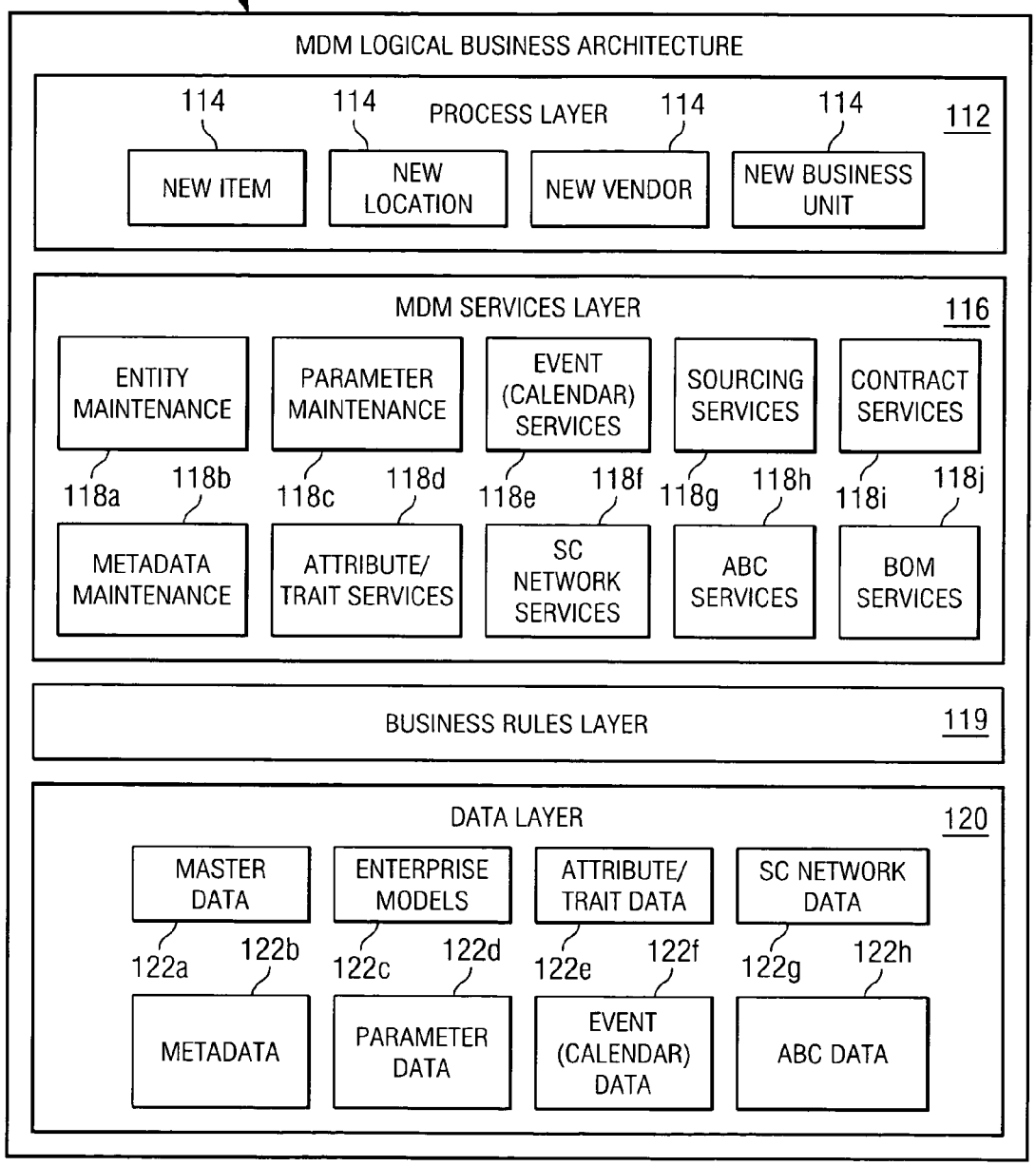
FIG. 5 illustrates an example high level logical business architecture for an MDM system.

FIG. 5 illustrates an example high level logical business architecture 110 for an MDM system 104. In general, the logical business architecture represents a business-centric view of MDM system 104 and includes core business processes, services, and data elements that MDM system 104 may be required to provide depending on the nature of the enterprise associated with MDM system 104. In one embodiment, MDM system 104 includes a process layer 112 that provides a context for implementing and wholly or partially automating business configuration processes 114. A service layer 116 underlying process layer 112 provides services 118 providing functions enabling process tasks that are appropriate for processes 114. A data layer 120 underlying service layer 116 provides base data models and physical representations for storing core enterprise reference data 122 for retrieval and use in connection with processes 114 and associated services 118.

An understanding of the fundamental concepts relating to the purposes and functions of MDM system 104 may aid in understanding the MDM architecture. At the core of MDM system 104 is the concept of data management, which encompasses both what data is stored and how that data is stored and made available for use. Since MDM system 104 is primarily concerned with structural data describing the enterprise or, more precisely, with data associated with entities within the business structure of the enterprise, the focus of the MDM architecture is on the storage, management, and retrieval of data associated with entities or with relationships between entities. In one embodiment, MDM system 104 provides such data storage, management, and retrieval using a core MDM reference data repository based on a multi-dimensional database construct.

Consider the following example. One example of an entity associated with a retail enterprise is an item. Items may have attributes such as size, weight, color, etc. If a particular entity, in this case a particular item, is considered a coordinate in a first dimension representing items, then the attributes of the particular item entity are associated with the coordinate for the particular item in the item dimension. At this point, the example involves only a one-dimensional line space, where discrete points on the line represent particular items.

Another example of an entity associated with an enterprise is a store or other location. Locations may have attributes such as size, physical address, etc. Like the particular item discussed above, a particular location may be considered a coordinate in a second dimension representing locations, where the attributes of the particular location entity are associated with the coordinate for the particular location in the location dimension. At this point, the example involves two one-dimensional line spaces, where discrete points on the first line represent particular items and discrete points on the second line represent particular locations. The example may be extended to include attributes that depend on the combination of a particular item and a particular location. Neither the item dimension nor the location dimension alone will suffice to store such multi-dimensional attributes. However, if the item and location dimensions are viewed as axes, and each intersection of item and location coordinates within an area defined by an orthogonal arrangement of these axes is viewed as a (item, location) point in two-dimensional entity space at which such attributes are stored, the concept becomes clear.

The example can be further extended to include attributes that depend on the combination of any number of arbitrary entity dimensions, leading to the concept of attributes as generalized data stored at and retrieved from points in an n-dimensional entity space. For example, a particular three-dimensional entity space suitable for an example retail enterprise might include item, location, and time dimensions, where attributes stored at each (item, location, time) point within a volume defined by an orthogonal arrangement of these axes corresponds to a particular combination of entities in the item, location, and time dimensions. In one embodiment, all reference data 122 stored within MDM system 104 may be equivalent to an attribute associated with a point in n-dimensional entity space.

In one embodiment, an overriding characteristic of all data that is considered for inclusion within MDM system 104 is the multi-dimensional database construct described above. Hence, a core architectural principle for MDM system 104 may be to accommodate a dimensional data structure as a core element in every component of MDM system 104. This may have several important implications for the MDM architecture and design. Such important implications may include, without limitation: (1) a consistent mechanism for locating points in an n-dimensional entity space; (2) a consistent mechanism for storing data at and retrieving data from points in an n-dimension entity space; and (3) ensuring that all distinct data storage components support the above.

Another fundamental concept for MDM system 104 may involve optimization of the physical architecture and database structures for the desired functions of MDM system 104. The core MDM reference data repository, as described above, is primarily for data management and is structured to provide a rich data management framework. On the other hand, input and output data staging and distribution elements of MDM system 104 may require efficient data transfer and throughput. While many systems have attempted to provide a compromise architecture to handle all such needs, MDM system 104 is preferably structured so that each element is designed to optimally accomplish its corresponding functions.

MDM system 104 may provide value for enterprises in various industry settings, such as retailing, manufacturing, or other industry settings. Although retail examples may be provided for purposes of illustration, the present invention contemplates MDM system 104 being used in connection with, and being tailored to, any suitable enterprise. The MDM architecture and design are preferably constructed to provide elements suitable to allow for successful deployment of MDM system 104 across multiple industry types and multiple enterprises within a particular industry type.

A. Process Layer

As described above, MDM system 104 includes a process layer 112 that provides the context for implementing and wholly or partially automating business configuration processes 114. In general, processes 114 provide functions necessary to realize process workflows provided as part of the MDM solution, providing structure to enterprise activities and enabling those activities to be repeated, controlled, monitored, and improved over time. Each process 114 represents a sequence of tasks that together accomplish a business activity. MDM system 104 may provide native support for generic processes 114 and support specific to particular processes 114. In one embodiment, processes 114 allow rich business workflows to be embedded within MDM system 104 and supported using the resources within underlying service and data layers 116 and 120, respectively. In one embodiment, MDM system 104 provides a highly configurable, flexible, and extensible environment for implementing and wholly or partially automating any suitable processes 114.

Processes 114 may operate at two levels. The first level, the enterprise level, may include larger scale intra-enterprise and inter-enterprise processes 114 associated with management of data as it relates to the targeted goals of the MDM solution. For example, where MDM system 104 is associated with a retail enterprise, an example of a first level process 114 may be a new item introduction process 114 involving storage of externally generated data concerning a new item into the core MDM reference data repository. The second level may include smaller scale management processes 114 involving movement of data internal to MDM system 104, such as retrieval of data from the core MDM reference data repository in accordance with queries from user interface, analytics, or other services internal to MDM system 104.

For example, generic processes 114 that may apply to any enterprise and any dimension of MDM system 104 may include, without limitation: (1) new entity introduction; (2) entity maintenance; (3) metadata realignment; (4) entity extraction; and (5) entity replication.

1. New Entity Introduction

This process 114 represents the introduction of a new entity into MDM system 104. For an example retail enterprise, this may include introducing a new item, location, vendor, or customer. The process 114 may be initiated by the enterprise associated with MDM system 104 or by any other enterprise, such as a vendor of a new item being introduced. A vendor providing a new item may be considered an example of content exchange. In any case, the retail enterprise associated with MDM system 104 must add enterprise specific data to MDM system 104 for the new item, validate the data, approve use of the new item, and publish the new item as available for use by planning, execution, monitoring, or other enterprise solution components 106, possibly through replication. An example new item introduction process 114 is described more fully below with reference to FIG. 13.

2. Entity Maintenance

This process 114 involves updating one or more characteristics of an existing entity, such as an item, location, vendor, or customer for an example retail enterprise. The process 114 may be initiated by the enterprise associated with MDM system 104 or by any other enterprise, such as a vendor of an item for which one or more characteristics are to be updated. For example, an "improved" item may effectively retain its original part number and Stock Keeping Unit (SKU) but have one or more of its primary attributes altered by the vendor, such as its size, weight, or color. Similarly, the retail enterprise might alter one or more secondary attributes of an existing item.

3. Metadata Realignment

This process 114 involves movement within a dimension of one or more members of one level relationship to another level relationship in a dimensional hierarchy. For example, a retail enterprise might move an item from one class to another class, which would in turn require identification of the one or more members to alter and the target relationships. The process 114 may need to keep appropriate audit and journal trails may require one or more approval sub-processes.

4. Entity Extraction

This process 114 involves providing selection criteria for one or more entities, performing an appropriate query, and moving appropriate data or otherwise making the data available to the requesting role or subsystem.

5. Entity Replication

This process 114 involves systematic replication of data in MDM system 104 in whole or in part to other subsystems for internal use. Such replication may allow the data to be used in a more efficient fashion than through direct operational access to the core MDM reference data repository.

B. Service Layer

As described above, service layer 116 provides services 118 that provide functions enabling the construction of process tasks appropriate for processes 114. Each service 118 provides a useful unit of work or enables a process task in the context of MDM system 104. Services 118 are not processes 114; rather, a service 118 is more analogous to a task within a process 114 or an action in response to a request associated with a process 114, such as computing the value of a function associated with the service 118 or issuing a query to view, update, or delete information in the core MDM reference data repository. In one embodiment, services 118 within service layer 116 of MDM system 104 for an example retail enterprise may include, without limitation: (1) entity maintenance services 118a; (2) metadata maintenance services 118b; (3) parameter maintenance services 118c; (4) attribute/trait services 118d; (5) event (calendar) services 118e; (6) supply chain network services 118f; (7) sourcing services 118g; (8) activity based costing (ABC) services 118h; (9) contract services 118i; and (10) bill of materials (BOM) services 118j.

1. Entity Maintenance

Entity maintenance services 118a provide basic functions for navigating, accessing, filtering, and sorting entities within MDM system 104. For an example retail enterprise, items, locations, vendors, and customers may be types of entities that are managed within MDM system 104 and maintained using entity maintenance services 118a.

2. Metadata Maintenance

Metadata maintenance services 118b provide basic functions for the construction, management, and realignment of appropriate metadata. For example, such metadata may include metadata describing the enterprise as a whole, the structure of MDM system 104, the structures of the data staging areas of MDM system 104, and the relationships between the data staging areas and the core MDM reference data repository. Such functions may include the ability to create dimensions and to define hierarchies on the dimension spaces, where each hierarchy includes a number of levels each having a number of members. Such functions may also include maintenance with respect to dimensions, levels, and members, such as creation, modification, or deletion of such metadata elements.

3. Parameter Maintenance

Parameter maintenance services 118c provide basic functions for the maintenance, management, and distribution of enterprise solution component parameters (i.e., business rule parameters). One or more parameters may be, but are not required to be, specific to one or more particular enterprise solution components 106. Each parameter may be tied to one or more entities and, as such, may be viewed as a secondary attribute of the entities (as opposed to a primary attribute such as size, weight, and color of an example item). Parameter maintenance services 118c provide functions particularly appropriate for these types of attributes. MDM system 104 may not only provide storage for such attributes and enable retrieval of such attributes for use, but may also provide a standardized management paradigm for all parameters in the overall enterprise solution. In one embodiment, this has the beneficial effect of providing a uniform methodology for parameter management and relieves point solution components from providing such functionality.

4. Attribute/Trait Services

Some attributes of entities are quantitative, well-defined, and stable over time. Examples of such attributes might include the size, weight, and color of an item or the address of a vendor. Other types of attributes are more qualitative, not as well-defined, and may change over time. These attributes, which may be referred to as traits, are often useful for customer-centric marketing and serve as the basis for attribute/trait cluster generation. Attribute/Trait services 118d provide functions appropriate for this type of data residing within or managed using MDM system 104. Since the number, and even the types, of such attributes/traits are typically not known a priori, the requirements for the physical structure of a system to handle this type of data are somewhat different than for more static master data. Attribute/Trait services 118d provide basic functions for creating, maintaining, and using this type of data and may also include more sophisticated services such as attribute/trait clustering services.

5. Event (Calendar) Services

Event, or more generally calendar, services 118e deal with management of time-related activities. These services 118e provide basic functions for establishing reference calendars and for creating and managing time-related activities (i.e., events with respect to established calendars).

6. Supply Chain Network Services

Supply chain network services 118f provide basic functions for supporting the definition and use of the physical supply chain network associated with an enterprise. The supply chain network is crucial to many planning, execution, monitoring, and other enterprise solution components 106 supported using MDM system 104.

7. Sourcing Services

Sourcing services 118g provide basic functions for accessing and using elements of the MDM model that are relevant to sourcing solution components, such as a supplier relationship management solution component.

8. Activity Based Costing (ABC) Services

A number of useful measures may be associated with entities, such as items where MDM system 104 is associated with an example retail enterprise, that traditionally have not been associated with an item catalog or similar construct. These measures may enable useful advanced analysis. One example is cost and price data associated with items. Such data may be used for advanced pricing optimization and ABC analyses. In one embodiment, MDM system 104 provides models to capture cost data, such as cost elements that when aggregated represent the total landed cost of goods. Included in these models are costs associated with activities such as handling an item as it passes through points in the associated supply chain network. ABC services 118h provide basic functions for handling ABC data stored within and managed using MDM system 104. Moreover, data such as normalized demand profiles (or associations to such profiles) are examples of secondary attributes that MDM system 104 may need to be accommodate.

9. Contract Services

In one embodiment, MDM system 104 does not inherently create or manage contracts for an example retail enterprise. However, MDM system 104 preferably provides a repository for contract data as it relates to entities stored within MDM system 104 and provides a centralized distribution mechanism for contract data to appropriate enterprise solution components 106. Contract services 118i provide basic functions for inputting, associating, and distributing contract-related data related to core enterprise data residing within MDM system 104.

10. Bill of Materials (BOM) Services

For an example retail enterprise, BOM services 118j provide basic functions for creating, managing, and visualizing BOMs for the enterprise. For example, a single actual BOM may be too atomic for planning purposes, such that suitable aggregation of one or more actual BOMs into a representation appropriate for planning may be required to support a planning system associated with MDM system 104. MDM system 104 may store such representations as reference data and make them available to planning or other external operational systems as needed. MDM system 104 may also automatically generate such representations, based on an MDM BOM model, to reduce or eliminate the need for manual evaluation and aggregation of individual actual BOMs to order to create such representations. BOM services 118*j* preferably support the elements of any appropriate MDM BOM model.

C. Business Rules Layer.

Business rules layer 119 provides business rules for designing business processes. A business rule designates a series of activities to be performed. An activity may be performed in response to the performance of another activity, an event, a decision, or other suitable trigger. Business rules layer 119 separates data having soft constraints from data of data layer 120 having hard constraints.

D. Knowledge Layer

The knowledge layer may record causal information that is learned from adjusting watchpoints and monitoring the results of the adjusted watchpoints.

The knowledge layer may include a causal tree, or a "fishbone," that may be used to identify one or more possible causes of an unanticipated variability. The tree may include an unanticipated variability, or a symptom. The symptom may be linked to one or more root causes. A causal tree may include one or more levels of intermediate causes between the symptom and the root causes. For example, a symptom may be linked to one or more intermediate causes, at least some of which may be linked to a next level intermediate cause or to a root cause. Accordingly, from the symptom, one or more root causes may be identified. MDM database 48 may also include data used to adjust an inventory plan in accordance with a cause of a variation. The data may link the cause with a particular adjustment of the inventory plan that may reduce the variation. For example, a cause may be linked with a watchpoint adjustment.

If the causal tree identifies more than one root cause, learning may be used to narrow down the root causes. A watchpoint may be adjusted according to an identified root cause and the performance may be measured. If the performance improves, then the adjusted watchpoint may be selected to be used. If the performance does not improve, then another adjustment may be made according to another identified root cause. The process is repeated until sufficient performance is achieved. The causal tree may be updated to record the learning.

E. Data Layer

MDM system 104 is fundamentally concerned with the ability to create, manipulate, and extract data associated with the enterprise solution. As described above, data layer 120 provides the base data models and physical representations for storing various types of enterprise reference data 122 for retrieval and use in connection with processes 114 and associated services 118. In one embodiment, reference data 122 within data layer 120 of MDM system 104 for an example retail enterprise may include, without limitation: (1) master data 122*a*; (2) metadata 122*b*; (3) enterprise models 122*c*; (4) parameter data 122*d*; (5) attribute/trait data 122*e*; (6) event (calendar) data 122*f*; (7) supply chain network data 122*g*; and (8) ABC data 122*h*.

1. Master Data

Master data 122*a* represents core configuration data associated with entities, such as items, locations, vendors, and customers for an example retail enterprise. Many aspects of value chain management generally, and most planning, execution, monitoring, or other enterprise solution components 106 in particular, require reference data 122 regarding what items are sold, what locations sell the items, what vendors supply the items, what customers purchase the items, and other fundamental data elements on which all other enterprise data is built or to which all other enterprise data relates in some manner. MDM system 104 may extend the traditional concept of master data with respect to such entities to accommodate complex business workflows envisioned for an enterprise solution. Although legacy masters, for example item masters, may capture attributes of items such as SKUs that indicate where the items fit into the hierarchical structure of the enterprise data, there is no guarantee that a legacy system could manipulate or even view such data in a dimensional sense. In one embodiment, an item or other master for MDM system 104 is able to create, manipulate, navigate, view, and extract data in a dimensional way.

In one embodiment, an entity within a master data type represents an atomic member of that type, such as a particular item, a particular location, a particular vendor, or a particular customer. Attributes of entities such as items, locations, and the like may have important roles with respect to planning, execution, monitoring, and other enterprise solution components 106. A first type of entity attribute is a physical or primary attribute generally associated with inherent characteristics of the entity, such as size, weight, and color for an example item entity. Primary attributes may be very important, for example, in planning product assortments or solving logistics problems associated with shipping an order for an item. Primary attributes are reasonably static and require no other context for meaning than the associated entity itself. A second type of entity attribute exists as a consequence of the use of the entity within the enterprise, which may result in a defined relationship of the entity to another entity or to an external metric. An example of such as attribute of an item might be the category or sub-category within the enterprise to which the item is assigned. This type of attribute, often referred to as a qualitative or secondary attribute, may be very important for more advanced analytic techniques such as item grouping/clustering, customer focused marketing, and promotions. In one embodiment, master data 122*a* allows MDM system 104 to manage both primary and secondary attributes of entities.

It may be important to distinguish between data considered to be master data 122*a* and data considered to be attribute/trait reference data 122*e* described below. As discussed above, master data 122*a* may be reasonably static and may not change rapidly over time. For example, a color (primary attribute) of a particular shirt may not change within a season the shirt is sold. Although the sub-category within the enterprise to which the shirt is assigned (secondary attribute) may change, as a result of a realignment for example, such changes will likely be infrequent. In contrast, for example, attributes/trait data 122*e* may be heavily used for targeted assortment and hence must capture dynamic behaviors of customers. In addition, attributes/traits may themselves change, with new attributes/traits being added as appropriate and existing attributes/traits which are no longer valid being dropped as appropriate.

2. Metadata

Another form of reference data 122 that is inherent to the entity masters described above and is very important to many enterprise solution components 106 is enterprise metadata 122*b*. In general, metadata 122*b* is data describing other data. In the context of MDM system 104, metadata 122*b* describes the structure of the data stored in and managed using MDM system 104. In general, metadata 122*b* provides a description of the structure of the dimensional view of master data 122*a*. This description focuses on what dimensions exist, what levels describe the dimension coordinates, and what members exist and are associated with the levels. In addition, navigation constructs referred to as hierarchies may be defined. For example, for an example retail enterprise, metadata 122*b* might include the various levels of the taxonomy of items and one or more hierarchies for navigating through the various levels of the taxonomy. In one embodiment, MDM system 104 captures metadata 122b in a form that can be effectively replicated to downstream enterprise solution components 106 that require consistency in the dimensional view of master data 122a. As described above in connection with metadata maintenance services 118b, MDM system 104 may manage the creation, manipulation, and deletion of metadata 122b and provide for realignment of master data 122a (e.g., moving an item from a first category to a second category) such that any realignment is properly reflected in metadata 122b.

3. Enterprise Models

Enterprise models 122c represent organizational views of the roles within an enterprise. In one embodiment, enterprise models 122c may extend beyond the enterprise boundary to cover all organizational elements of the value chain associated with the enterprise. Enterprise models 122c may be important with respect to authentication and authorization aspects of data access. Additionally, enterprise models 122c may provide for approval chain relationships important to business process management.

Figure 6:
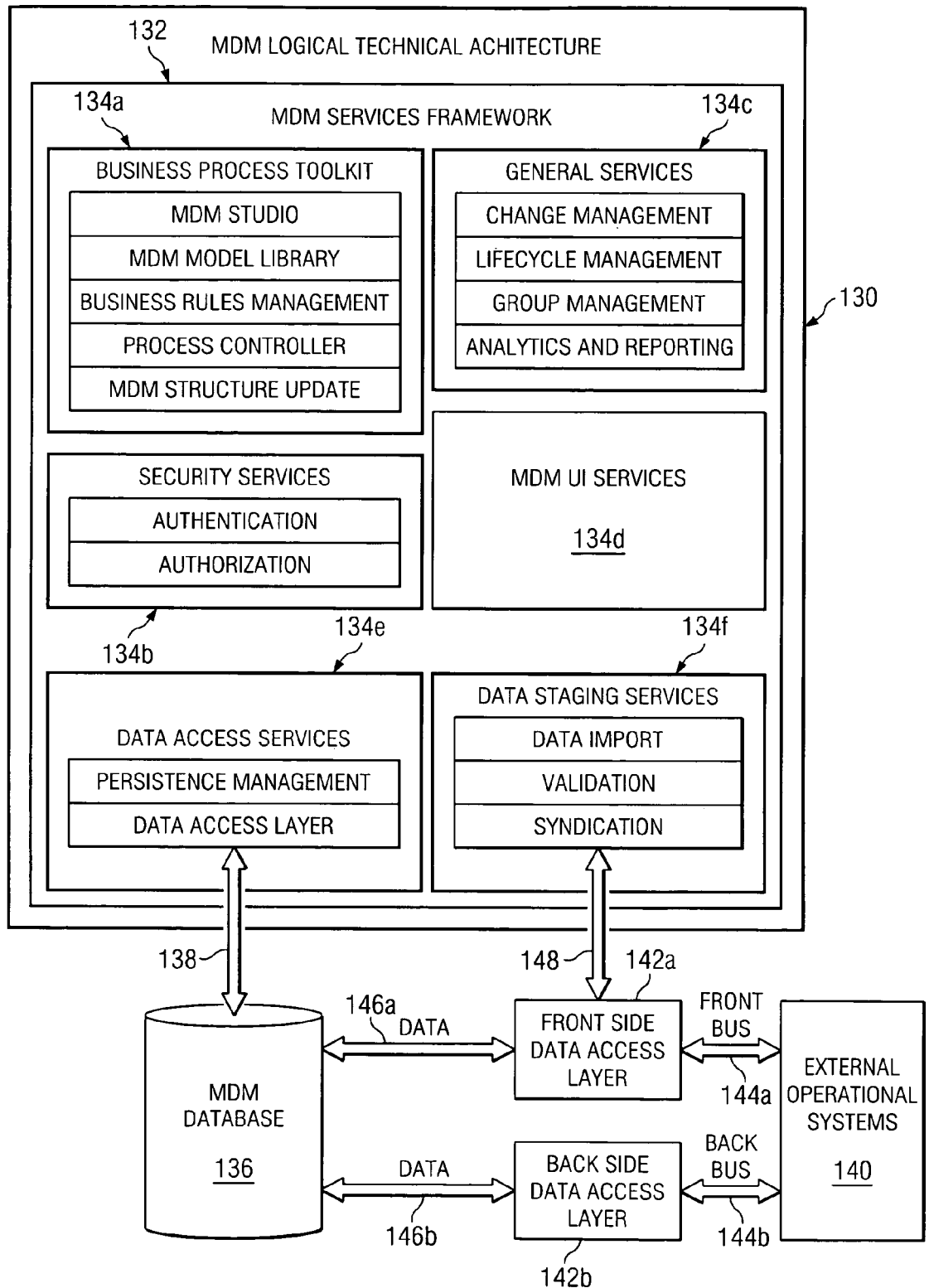
FIG. 6 illustrates an example high level logical technical architecture for an MDM system.

4. Parameter Data
5. Attribute/Trait Data
6. Event (Calendar) Data
7. Supply Chain Network Data
8. Activity Based Costing (ABC) Data VI. MDM Logical Technical Architecture FIG. 6 illustrates an example high level logical technical architecture 130 for MDM system 104. In general, logical technical architecture 130 represents a technology-centric view of MDM system 104 and specifies logical elements of MDM system 104 that together may operate to provide the desired MDM solution. In one embodiment, logical technical architecture 130 includes an MDM services framework 132 containing core MDM services 134. MDM database 136 includes the core MDM reference data repository. Certain services 134 may be applied to any classes of reference data 122 to be modeled within the core MDM reference data repository. Other services 134 may be tailored to particular classes of reference data 122 modeled within the core MDM reference data repository. Other services 134 may generically support various security, data access, data staging, and other data management needs. Example services 134 are described more fully below. Appropriate services 134 may access database 136 using one or more appropriate data access links 138.

External operational systems 140 may access database 136 using one or more data access layers 142. In one embodiment, an external operational system 140 may access database 136 in connection with a business workflow using a "front side" data access layer 142a, an associated "front" bus 144a between external operational system 140 and front side data access layer 142a, and an associated data interface 146a between front side data access layer 142a and database 136. Front side data access layer 142a is typically used to pass control data from external operational systems 140 to MDM system 104 for controlling MDM operations and may be associated with application integration. One or more services 134 may access front-side data access layer 142a using one or more suitable data access links 148. An external operational system 140 may access database 136 using a "back side" data access layer 142b, an associated "back" bus 144b between external operational system 140 and back side data access layer 142b, and an associated data interface 146b between back side data access layer 142b and database 136. Back side data access layer 142b is typically used for movement of reference data 122 to and from external operational systems 140 and may be associated with data integration. However, front side data access layer 142a may also be used to move reference data 122 to and from external operational systems 140 where appropriate, for example, where an external operational system 140 requires particular reference data 122 in a particular message-based or other format.

A. Logical Data Services Architecture

FIG. 7 illustrates an example high level logical data services architecture 150 for MDM system 104. In one embodiment, data services architecture 150 includes primary layers: (1) a "front side" data services layer 152a; (2) a physical data layer 154; and (3) a "back side" data services layer 152b. Front side data services layer 152a is associated with front side data access layer 142a, described above with reference to FIG. 6, and provides direct data access to internal MDM services 134 that directly access the core MDM reference data repository within database 136. For example, front side data services layer 152a may provide direct access to database 136 for internal analytics or user interface service queries. Physical data layer 154 includes database 136 in which the core MDM reference data model resides. Back side data services layer 152b is associated with back side data access layer 142b, described above with reference to FIG. 6, and provides indirect data access to external operational services 156 associated with external operational systems 140 that indirectly access the core MDM reference data repository within database 136. For example, back side data services layer 152b may provide operational services with indirect access to database 136 through staging areas of database 136, staging areas associated with external operational systems 140, and persistent data stores associated with external operational systems 140. In a physical deployment, each of the three primary layers of data services architecture 150 may be mapped to appropriate technology components.

Front side data services layer 152a may be mapped to an appropriate object-based services layer, such as Common Object Request Broker Architecture (CORBA) or JAVA 2 PLATFORM ENTERPRISE EDITION (J2EE), residing on an appropriate application server within an application server layer (described below with reference to FIG. 12). In certain embodiments, front side data services layer 152a may be more tightly coupled to physical data layer 154 due to the necessity of an object-to-relational translation layer as part of front side data services layer 152a.

Database 136 within physical data layer 154 may be implemented as a relational database. Database 136 may be modeled and managed in a number of ways, one of which may be selected for a particular deployment. In one embodiment, object relational database management technology may be used, although this approach is typically subject to performance risks. With this approach, the core MDM reference data model may be mapped to existing services 134 using a suitable object relational mapping layer. In an alternative embodiment, for improved performance or other reasons, a fixed data model relational database with a light access layer may be used. The light access layer would provide persistent objects tailored to the fixed and optimized physical schema of the relational database rather than driving the physical schema through an object relational mapping layer. With this approach, new services 134 may be mapped to an existing core MDM reference data model.

Although a single core MDM reference data repository within a single database 136 is primarily described herein for convenience, the present invention contemplates any number of core MDM reference data repositories within any number of databases 136 according to particular needs. However, all core MDM reference data repositories within all databases 136 are subject to centralized data management associated with a single MDM system 104 and preferably appear to both internal MDM services 134 and external operational services 156 as a single core MDM reference data repository.

Back side data services layer 152b is preferably optimized for potentially large data synchronization and replication operations, preferably incorporating net change techniques, efficient store procedure techniques, and an object-based control layer. Furthermore, since back side data services layer 152b maps to planning, execution, monitoring, or other enterprise solution components 106 for which data movements and associated mappings (i.e., transformations) must remain reasonably fixed over time, the core MDM reference data model should also be reasonably fixed over time.

B. Logical Data Repository Architecture

FIG. 8 illustrates an example high level logical architecture 170 of database 136. In one embodiment, database 136 incorporates a consistent dimensional modeling framework imposed on a model supporting a persistence management service, which is described more fully below. This preferably allows services framework 132 to manage reference data 122 within database 136 in a manner that is consistent with established dimensional views of reference data 122. Where MDM system 104 does not physically contain all reference data 122, reference data 122 that is not physically contained in MDM system 104 preferably appears as if it is physically contained in MDM system 104. Database 136 includes a managed data area 172 containing reference data 122, at least some of which may be managed remotely from MDM system 104. Managed data area 172 provides the core MDM reference data repository for reference data 122. Database 136 may also include a cached data area 174 containing cached data 176 representing reference data 122 that has been extracted from managed data area 172, processed according to the needs of one or more elements of MDM system 104 using a data management framework 178, and is re-inserted in managed data area 172 as reference data 122 once processing is complete. For example, data management framework 178 may provide the process controller within business process toolkit 134a, UI services 134d, or any other suitable element of MDM system 104 with operational access to cached data 176.

Reference data 122 stored within MDM system 104 has an assigned state consistent with its use. In one embodiment, in association with data management framework 178, cached data area 174 provides a mechanism to hold a copy of reference data 122 for manipulation while the state of reference data 122 in managed data area 172 is maintained as locked for read only access until the manipulation process has completed. Once a copy of reference data 122 is being held as cached data 176 within cached data area 174 during the manipulation process, the manipulation process sees only the state of cached data 176 within cached data area 174, while other processes, services, and systems associated with MDM system 104 see the true state of reference data 122 within managed data area 172 rather than an intermediate state reflecting the still incomplete manipulation process.

Database 136 may also include an operational access area 180 providing one or more external operational systems 140 with access to reference data 122 within managed data area 172. Where MDM system 104 is associated with an example retail enterprise, external operational systems 140 may include external enterprises such as manufacturers, distributors, and vendors of items associated with enterprise. External operational systems 140 may also include planning, execution, monitoring, and other enterprise solution components 106 within the enterprise but external to MDM system 104. Operational access area 180 may containing a master copy 182 of an Lightweight Directory Access Protocol (LDAP) repository used to provide authentication and authorization services as described more fully below. Operational access area 180 may also contain inbound and outbound staging areas 166 and 168, respectively, for data that is inbound from and outbound to, respectively, external operational systems 140.

C. Information Sharing Architecture

Figure 9:
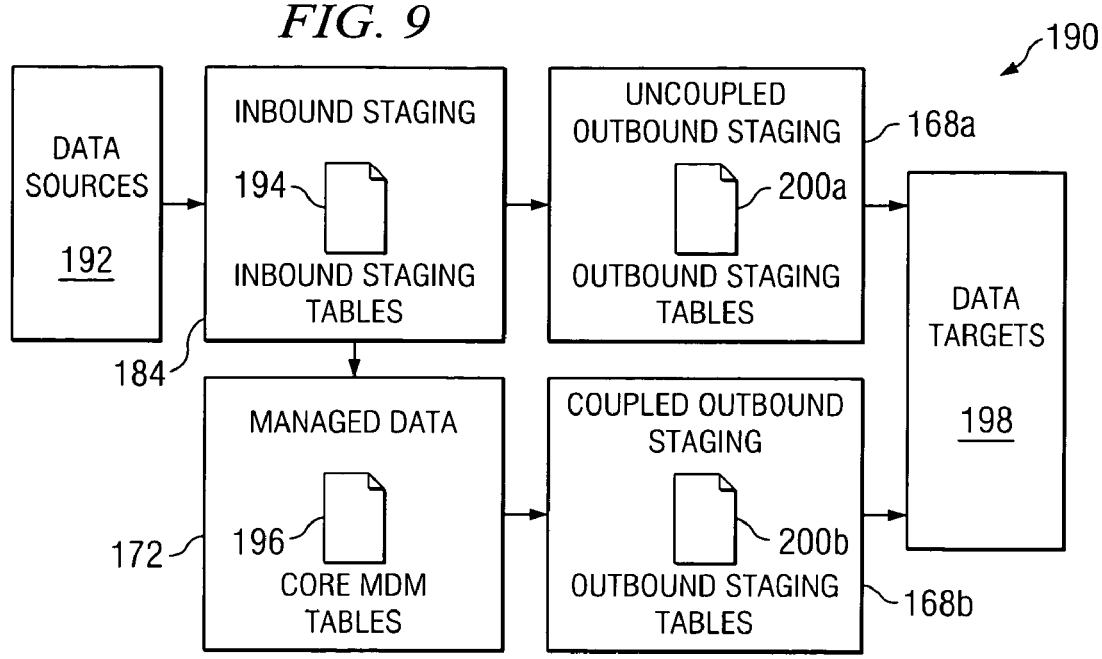
FIG. 9 illustrates an example information sharing architecture for an MDM system.

In one embodiment, data may enter MDM system 104 from any appropriate source and may leave MDM system 104 for any appropriate target. Unless reference data 122 stored within the core MDM reference data repository can be readily made available to external operational systems 140, storing reference data 122 within the core MDM reference data repository may provide little value to the enterprise. Conversely, there may be other data residing within portions of the enterprise that needs to be distributed to other portions of the enterprise through MDM system 104. FIG. 9 illustrates an example information sharing architecture 190 for MDM system 104. In one embodiment, database 136 may be optimized for management of reference data 122 rather than for speed of data input or data output. Accordingly, a staging strategy may be employed to minimize data transfer times to and from external operational systems 140.

As described above, inbound data may be received from one or more data sources 192 for storage in the core MDM reference data repository of managed data area 172. Data sources 192 may include persistent data stores associated with external enterprises 140a, such as manufacturers, distributors, vendors, and customers where MDM system 104 is associated with an example retail enterprise. Data sources 192 may also include operational staging data stores associated with planning, execution, monitoring, or other enterprise solution components 106. The inbound data is first moved into inbound staging tables 194 of inbound staging area 184, then into core MDM tables 196 within the core MDM reference data repository of managed data area 172 as reference data 122. Data cleansing, validation, transformation, or other processing may occur, where appropriate, during the movement of data from inbound staging area 184 to the core MDM reference data repository managed data area 172. For example, it may be very important that reference data 122 stored within the core MDM reference data repository and made available to external operations systems 140 is considered clean, such data cleansing in connection with loading of inbound data.

As described above, outbound data may be provided to one or more data targets 198, such as persistent data stores associated with external enterprises 140a or operational staging data stores associated with planning, execution, monitoring, or other external enterprise solution components 106. Outbound data being distributed using MDM system 104 without being stored in the core MDM reference data repository may be sent from inbound staging tables 194 of inbound staging area 184 to outbound staging tables 200a of uncoupled outbound staging area 186a, then out to data targets 198. Similarly, outbound reference data 122 in the core MDM reference data repository of managed data area 172 may be moved out of core MDM tables 196 of managed data area 172 to outbound staging tables 200b of coupled outbound staging area 186b, then out to data targets 198. Reference data 122 stored within core MDM tables 196 may be substantially continuously synchronized with the outbound data in outbound staging tables 200, such that at any point in time an accurate snapshot of reference data 122 is available within outbound staging area 186. Synchronization of reference data with operational data may be important, for example, to help ensure that planning based upon operational data is not performed for an entity that no longer exists within the enterprise as reflected in reference data 122. Data transformation or other processing may occur, where appropriate, during the movement of reference data 122 from the core MDM reference data repository of managed data area 172 to outbound staging area 186.

D. MDM Services Framework

Referring again to FIG. 6, in one embodiment, services framework 132 may provide services 134 organized into the following groups, without limitation: (1) business process toolkit 134a, (2) security services 134b, (3) general services 134c, (4) user interface services 134d, (5) data access services 134e, and (6) data staging services 134f.

1. Business Process Toolkit

Business process toolkit 134a may be provided using a corresponding subsystem within services framework 132 that provides for management of MDM models, processes, and associated business rules. Automated processes associated with this subsystem may be used to implement model changes associated with physical deployment of MDM system 104. In one embodiment, business process toolkit 134a may include, without limitation: (1) an MDM studio, (2) an MDM model library, (3) a business rules management service, (4) a process controller, and (5) an MDM structure update service.

a. MDM Studio & MDM Model Library

Figure 10:
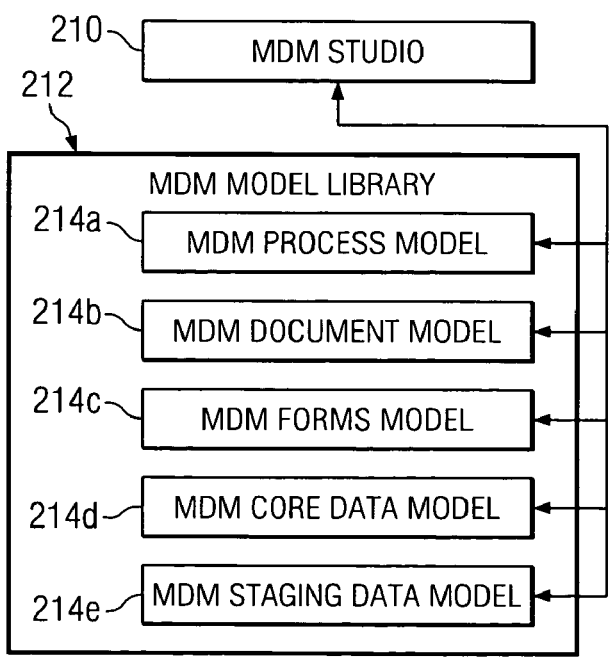
FIG. 10 illustrates an example MDM studio and an associated MDM model library.

FIG. 10 illustrates an example MDM studio 210 and an associated MDM model library 212 containing one or more MDM models 214 appropriate for MDM system 104. MDM studio 210 may provide services to model the structure of MDM system 104 and its components, for example, for purposes of constructing MDM system 104 or for purposes of extending or otherwise updating MDM system 104. MDM studio 210 may provide support for one or more graphical modeling user interfaces. Modeling of MDM system 104 may include, for example, modeling structural aspects of the core MDM reference data repository within managed data area 172 of database 136, modeling the structure of staging areas 166 and 168 of database 136, and modeling appropriate process workflows. MDM studio 210 may provide support both for initial construction of MDM models 214 and later extension or other updating of MDM models 214. In one embodiment, MDM models 214 include, without limitation: (1) MDM process model 214a, (2) MDM document model 214b, (3) MDM forms model 214c, (4) MDM reference data model 214d, and (5) MDM staging data model 214e.

(1) MDM Process Model

Process models 214a describe the processes 114 to be used for managing reference data 122 stored within the core MDM reference data repository within database 136. In one embodiment, for a particular process 114, the corresponding process model 214a describes the flow of tasks to be performed on reference data 122 in connection with process 114, particular services 118 associated with these tasks, and one or more particular process engines responsible for execution of process 114. For service oriented tasks, descriptions may utilize Web Services Description Language (WSDL) protocols. Each process 114 may represent one or more user interface task flows, enterprise solution component task flows, inter-enterprise process flows, or any other appropriate processes or task flows. Process model 214a may specify allocation of each process 114 to a process controller, user interface controller, or enterprise-level workflow controller. Process model 214a may also provide for graphical or other simulation of processes 114.

(2) MDM Document Model

Document model 214b provides the metadata for MDM documents that are utilized in connection with processes 114. In one embodiment, MDM documents represent external cached representations of specific metadata elements within the underlying reference data model 214d.

(3) MDM Forms Model

Forms model 214c provides metadata describing forms associated with objects within reference data model 214d. Forms may be important for efficient extraction of metadata elements from reference data model 214d and may be analogous to database views.

(4) MDM Reference Data Model

Reference data model 214d represents the metadata describing reference data 122 stored within the core MDM reference data repository. This is the lowest level metadata representation contained within model library 212. In one embodiment, reference data model 214d may be an enterprise meta-model in Extensible Markup Language (XML) Software Description (XSD) format, which may separate instance data from metadata in a manner desirable for management and which back side data access layer 142b may read directly from model library 212. It may be important to synchronize changes to reference data model 214d with any higher level constructs, such as forms model 214c or document model 214b. Synchronization of models 214 may be automatic or, if appropriate, studio 210 may flag the need for changes and direct an administrative user to assist in synchronizing models 214.

A generic reference data model for reference data 122 to be stored within the core MDM reference data repository may be constructed to represent a synthesis of all applicable data elements, such as all data elements associated with enterprises in the retail industry for example, and may be viewed as a superset of reference data models 214d to be used in actual deployments of MDM system 104. The generic reference data model, and all reference data models 214d ultimately derived from the generic reference data model, should be constructed for consistency and efficient management of reference data 122. In one embodiment, the generic reference data model may be captured as a document in an annotated RATIONAL ROSE object model.

(5) MDM Staging Data Model

Staging data model 214e represents metadata describing the structure of inbound and outbound staging tables 194 and 178, respectively, and also the mapping between reference data model 214d and the staging table representation of the data within inbound and outbound staging tables 194 and 178, respectively. Reference data model 214d may be a normalized data model derived from a generic reference data model as described above. However, inbound data may reflect arbitrary schema that are inconsistent with reference data model 214d. For inbound data, appropriate mappings (i.e., transformations) of reference data model 214d to source data models, such as an inbound staging data model 214e representing an arbitrary input data format for an external operational system 140, may be performed as inbound data is being stored in the core MDM reference data repository. Similarly, outbound data may need to be de-normalized for consumption as operational data. For outbound data, appropriate mappings (i.e., transformations) of reference data model 214d to target data models, such as an outbound staging data model 214e representing a flat output data format for an external operational system 140, may be performed as reference data is being moved out of the core MDM reference data repository b. Business Rules Management Service Referring again to FIG. 6, the business rules management service may provide for creation and maintenance of business rule elements associated with services 118, such as import validation rules, staging transformation rules, and general consistency rules associated with MDM system 104. The business rules management service may provide for run-time-script-based rules or for association of design-time rules objects with MDM process workflows.

c. Process Controller

The process controller may represent a run-time process workflow controller for MDM system 104. As described above, process model 214*a* may specify allocation of one or more processes 114 to the process controller, a user interface controller, or an enterprise-level workflow controller. In one embodiment, the process controller operates in cooperation with any such user interface controller and any such enterprise-level workflow controller.

d. MDM Structure Update Service

In one embodiment, MDM system 104 provides a mechanism to model its structure and a mechanism to automate a process to realize an extension of that model in a physical deployment. The structure update service may provide for automated implementation of a model 214 that is created or changed during the modeling process. The structure update service may be particularly important with respect to the structure of inbound and outbound staging areas 166 and 168, respectively. It may be necessary to initially specify staging data model 214*e*, the reference model to staging area structure. In addition, it may be necessary to generate appropriate Structured Query Language (SQL) or changes to SQL to maintain the state of staging areas 166 and 168 relative to staging data model 214*e*. Without automation of these tasks using the structure update service, maintaining coordination of various elements of MDM system 104 would be a very intensive manual task. The structure update service may also provide for updating staging data model 214*e* and other models 214, along with associated SQL, in response to updates provided with enterprise solution components 106. Such structure updates may be driven according to update description script documents providing information necessary for the structure update to automatically execute.

2. Security Services

Naturally, only users with appropriate access should be permitted to view or manipulate reference data 122 within MDM system 104. Security services 134*b* may be provided using a corresponding subsystem within services framework 132 designed to fulfill two primary responsibilities. The first responsibility is to control access to MDM system 104 itself. The second responsibility is to manage the structure of the security model as applied to enterprise solution components 106. For this responsibility, services are provided to manage the security context that all enterprise solution components 106 will utilize, through an LDAP repository whose master copy 182 resides within operational access area 180 of database 136. Security services 134*b* may include, without limitation: (1) authentication services, and (2) authorization services.

a. Authentication

Authentication services provide initial log-in security with respect to enterprise solution components 106. Authentication is preferably based on an organizational model for the enterprise to provide a single log-in security context for all enterprise solution components 106.

b. Authorization

Authorization services provide layered, granular access to specific services 118 or reference data 122 for an authenticated user. Authorization may be provided at two levels. The first level (Level 1) deals with access to enterprise solution components 106 represented by specific applications or high level groups of services 118. The second level (Level 2) deals with access to specific functions within an enterprise solution component 106. Field level authorization may be handled by particular enterprise solution components 106 themselves as appropriate. In the case of MDM system 104 itself, any required authorization above Level 2 (i.e., Level 3 and higher) may need to be provided within MDM system 104.

3. General Services

General services 134*c* may be provided using a corresponding subsystem within services framework 132 and may include, without limitation: (1) a change management service; (2) a lifecycle management service; (2) a group management service; and (4) an analytics and reporting service.

a. Change Management

The change management services provides an audit trail for changes made to MDM system 104. For example, information may be kept regarding who made a change, at what time the change was made, and perhaps the value that was changed. The audit trail for changes should preferably be implemented in such a fashion that the mechanism can be turned off for information not requiring change management or for changes prior to configuration control, such as changes associated with initial setup of data elements. Logical grouping of reference data 122 may be important for many data management aspects, such as retrieving reference data 122 and making changes to reference data 122. Therefore, in terms of granularity, in one embodiment change management is group-based with overrides at the group member level.

b. Lifecycle Management

As described above, reference data 122 stored within MDM system 104 has an assigned state consistent with its use. The lifecycle management service allows for defining a lifecycle that describes the possible states for data elements, as well as a mechanism for managing the movement of data from one lifecycle state to another.

c. Group Management

Given the vast scope and scale of data that may potentially reside within MDM system 104, it is preferable that the overall strategy for data management be based on logical groups of data rather than individual data elements. Logical grouping of reference data 122 may be important for many data management aspects, such as retrieving reference data 122 and making changes to reference data 122. Although single entities may be manipulated, many updates will typically occur with respect to groups of entities. In one embodiment, the group aspect of data manipulation is built in from the foundation of MDM system 104.

d. Analytics and Reporting

The health and status of a large data repository, such as the core MDM reference data repository within database 136, is critical. The analytics and reporting service provides knowledge concerning what reference data 122 is stored within the core MDM reference data repository and the state of various system elements of MDM system 104. Although the types of analysis and associated reports will be specific to MDM system 104, general analysis and reporting tools may be used where appropriate. Analytics may extend to a broad range of activities supported directly by this service or indirectly through management by this service. Analytics may include clustering services for attributes/traits, decision support activities relating to entity data stored within the core MDM reference data repository, management of parameter computation such as coordinating parameter computation using an external engine, updating parameters such as lead times for items at particular locations, and any other suitable analytics.

Reports may include change log activity, history traces for specific entities or groups of entities, reports on production parameter sets including time-phased sets, calendar examination and reconciliation, reports on new entities (such as new items) entered into the core MDM reference data repository and dying entities (such as items) removed from the core MDM reference data repository, and any other suitable reports.

4. User Interface Services
5. Data Access Services

Data access services 134e may be provided using a corresponding subsystem within services framework 132 to provide a key interface between user interface layers, data management business rules, and the underlying core MDM reference data repository within database 136. Data access services 134e may be included within data management framework 178 described above with reference to FIG. 8. Since in one embodiment the predominant view of reference data 122 is object-based, data access services 134e may support a persistent mapping to underlying data structures within database 136. Accordingly, in one embodiment, data access services 134e may incorporate the concept of a data cache, such as cached data area 174 of database 136 described above, that provides a mechanism to hold a copy of reference data 122 in cached data area 174 for manipulation while maintaining the state of reference data 122 in the core MDM reference data repository of managed data area 172 as locked for read only access until the manipulation process has completed. Once a copy of reference data 122 is being held as cached data 176 within cached data area 174 during the manipulation process, the manipulation process sees only the state of cached data 176 within cached data area 174, while other processes, services, and systems associated with MDM system 104 see the true state of reference data 122 within managed data area 172 rather than an intermediate state reflecting the still incomplete manipulation process. Data access services 134e may include, without limitation: (1) a persistence management service; and (2) a data access layer service.

a. Persistence Management

The persistence management service provides the logical mapping between the user view of reference data 122 and the underlying persistent object model associated with reference data 122. The service provides for managing the creation, update, and deletion of model instances, including appropriate memory-level caching of persistent objects.

b. Data Access Layer

The data access layer service provides the link between the logical object model associated with reference data 122 and the physical instances of relational core MDM tables 196 in which the persistent objects are held as reference data 122. The separation of the persistence layer from a particular physical mapping layer allows for multiple physical targets, which is especially useful when a distributed physical data model is required (e.g., in certain cases of parameter maintenance).

6. Data Staging Services

Data staging services 134e may be provided using a corresponding subsystem within services framework 132, primarily to provide synchronization of inbound and outbound staging areas 166 and 168, respectively, with managed data area 172 of database 136. Data staging services 134e may include, without limitation: (1) a data import service; (2) a validation service; and (3) a syndication service.

a. Data Import

The data import service provides functions for moving data from external sources into database 136. For example, the data import service might be used to move existing master data into database 136 for storage and later redistribution to one or more planning, execution, monitoring, or other enterprise solution components 106. Importing data includes moving the inbound data into inbound staging area 184, validating and transforming the inbound data where appropriate, and moving the inbound data from inbound staging area 184 into the core MDM reference data repository of managed data area 172 as reference data 122.

b. Validation

The validation service allows predefined, as well as user-defined, validation rules to be applied to inbound data prior to insertion into database 136. Validation rules may include basic value type rules, referential integrity rules, enterprise-specific business rules, or any other suitable rule. In one embodiment, validation is selectable such that higher levels of validation may be used when an inbound data set is "dirty," requiring more stringent validation, and lower levels of validation may be used when an inbound data set is "clean," requiring less stringent validation.

c. Syndication

The syndication service, which essentially exports data from database 136 to planning, execution, monitoring, or other enterprise solution components 106, may have two primary elements. The first element provides functions for synchronization of core MDM tables 196 within managed data area 172 with outbound staging tables 200 within outbound staging area 186, such that a valid snapshot of reference data 122 exists at all times within outbound staging tables 200, consistent with update transaction boundaries. The second element provides functions for schedule-based or demand-based movement of data from outbound staging tables 200 to a target enterprise solution component 106.

VII. MDM Use Model

FIG. 11 illustrates an example MDM use model 230 for MDM system 104. In general, use model 230 describes how MDM system 104 will be used in terms of where data is stored and how the data is accessed. In one embodiment, the external operational systems 140 that interact with MDM system 104 view MDM system 104 as a reference data repository, not as an operational data source. Accordingly, reference data 122 within core MDM reference data repository 232 may be synchronized and replicated to local persistent stores 234 of external operational systems 140 through appropriate external access services 236 operating in association with one or both data access layers 142. Internal access services 238 associated with managing reference data 122 within MDM system 104 may have direct access to reference data 122 within core MDM reference data repository 232. In contrast, operational services 240 of external operational systems 140, which are not associated with managing reference data 122 within MDM system 104, may only access data within the associated persistent stores 234, never directly accessing reference data 122 within core MDM reference data repository 232. Thus, in essence, MDM system 104 may act as a secure system of record that is optimized in architecture and design for management of reference data 122 rather than operational use of reference data 122. Consuming services other than those related to managing reference data 122 are not permitted to directly access reference data 122.

In one embodiment, key metrics to be considered in designing a physical architecture in accordance with use model 230 may include, without limitation: (1) throughput performance; (2) query performance; (3) configuration flexibility; and (4) scale. Each of these metrics is discussed below in relation to appropriate physical characteristics of an implementation of MDM system 104.

A. Throughput Performance

The primary use model for MDM system 104 features a centralized master repository, core MDM reference data repository 232 of managed data area 172 of database 136, for the core enterprise data, reference data 122. In one embodiment, a goal is to shield core MDM reference data repository 232 from operational loading while allowing for optimal design of external operational systems 140 that use reference data 122 in an operational mode. Accordingly, as described more fully above, use model 230 calls for synchronizing and replicating reference data 122 into local persistent stores 234 of external operational systems 140 that use reference data 122. This implies a physical architecture and design that facilitate outbound throughput performance for moving reference data 122 from core MDM reference data repository 232 to target persistent stores 234. If reference data 122 is being moved in quantity from external operation systems 140 into MDM system 104, then the physical architecture and design should preferably also support inbound throughput performance. A primary design criterion following from the above is that physical data layer 154 should provide for as efficient access to reference data 122 as possible. It may be desirable to consider any indirection layer that resides between core MDM tables 196 containing reference data 122, which may have a relational table structure, and the exterior representation of reference data 122, which may be an object representation.

B. Query Performance

The context for query performance is that of constructing views of reference data 122 for the MDM user interface or an analytics service internal to MDM system 104, such as the analytics and reporting service described above with reference to FIG. 6. Such user interface and analytics service queries are likely to be more filter-driven, looking for particular subsets of reference data 122 within a much larger row context, than any SQL or other queries associated with the bulk export of reference data 122 discussed above with respect to throughput. The structure of physical data layer 154 and the associated data access layer service should be designed to handle potentially large numbers of complex queries in a timely manner. Return of large and small query result row sets should be efficient independent of the target service (e.g., the user interface). Design criteria for query performance may include low mean query response times at the database level, sufficient performance under inbound loading involving a large number of inbound queries, and minimal latency in the associated data access layer service.

C. Configuration Flexibility

Configuration flexibility may be examined from both the user view and the solution view. With respect to the user view, reference data 122 contained in core MDM reference data repository 232 needs to be mapped to a particular data view that the enterprise requires. With respect to the solution view, where the core metrics are typically performance in replication and query performance, configuration flexibility may be less critical if not counter to those metrics. In general, it would be unwise to change reference data model 194*d* for each enterprise deployment, since that would imply reconfiguration of all interfaces from core MDM reference data repository 232 to local persistent stores 234 of external operational systems 140. A design criterion for configuration flexibility is that reference data model 194*d* should be stable from deployment to deployment and should represent a superset of anticipated reference data 122 for any enterprise. Attainment of this state may be evolutionary over several deployments, but should be smoothly accomplished in a relatively short period of time without significant model redesign. If a user view mapping configuration is required, it should preferably be at the outermost layers of the design (i.e., close to the user interface rather than interior to data structures of core MDM reference data repository 232).

D. Scalability

Core MDM reference data repository 232 may hold vast amounts of reference data 122, particularly where MDM system 104 is associated with an example retail enterprise having very large numbers of items, locations, or other entities. If attribute/trait data 122*e* is utilized, where several hundred trait attributes per entity may be common, the potential for vast amounts of reference data 122 is even higher. These characteristics may effectively lead to large table row counts, complex relational joins, and the need for a dimension framework for reference data 122. A design criterion for scalability, which is also related to both throughput and query performance, is the ability to efficiently handle large row sets both when querying into the sets and when moving the sets. These type of efficiencies generally come from well-designed and well-tuned relational tables specifically engineered for performance-related metrics. A corollary is that the design should preferably be capable of utilizing parallel database technology if possibly required to sufficiently scale in the enterprise environment. If the design cannot utilize parallel database technology, then the option is lost when attempting to boost performance through deployment configuration.

V. User Interface Architecture

There are several drivers for the architecture and design of a user interface for MDM system 104. A first driver is the dual types of users of MDM system 104; the administrative role user and the process participant role user. The first classification of user role is concerned primarily with the administration of enterprise configuration information contained within MDM system 104, as well as the associated MDM models 214, which are realized physically in database 136. The second classification of user role is more concerned with viewing and entering information associated with processes 114, such as new item introduction for example. A modeling studio style interface may be more important to the administrative role user, while well-designed view and entry screen sequences may be more important to the process participant role user. User interface architecture and design requirements may be broken down along these or other suitable lines. A second driver is the flexibility that is inherent in the MDM architecture. In one embodiment, both reference data model 214*d* and staging data model 214*e* may be altered at the time of deployment. This provides flexibility for MDM system 104 to accommodate idiosyncrasies of the enterprise. Correspondingly, the user interface architecture preferably accommodates these flexible models. For example, if a field is added or deleted within reference data model 214*d* or staging data model 214*e*, a corresponding entry screen may accordingly adapt dynamically to the model change without the need for reprogramming.

IX. MDM Physical Architecture

FIG. 12 illustrates an example high level physical architecture 250 for MDM system 104, which may be loosely mapped to logical business architecture 110 described above with reference to FIG. 5 and logical technical architecture 130 described above with reference to FIG. 6.

In one embodiment, MDM system 104 includes a web server 252, an MDM application server layer 254, an infrastructure services application server layer 256, and an MDM database layer 258. Using a web browser or otherwise, a user associated with MDM system 104 may send a Hypertext Transport Protocol (HTTP) or other request to web server 252 to perform an appropriate operation. Web server 252 may communicate the request to one or more appropriate application servers within application server layer 254 to invoke one or more suitable applications 260. Application server layer 254 may include one or more application servers supporting engines 240*a* that provide process and service functions of MDM system 104, supporting the MDM user interface 240*b*, and supporting other suitable applications 240. Infrastructure services application server layer 256 may include one or more application servers supporting front side data access layer 142*a*, back side data access layer 142*b*, and a suitable enterprise-level workflow controller 242 that provides process and service functions associated with data access layers 142. For example, in one particular embodiment, front side data access layer 142*a* may be implemented using a WEBMETHODS product, back side data access layer 142*b* may be implemented in part using an INFORMATICA POWERCENTER product with an integrated Extract-Transform-Load (ETL) tool, and enterprise-level workflow controller 242 may be implemented using a WEBMETHODS BUSINESS INTEGRATOR product.

In one embodiment, implementation of processes 114 may be shared between enterprise-level workflow engine 262 of application server layer 256 and applications 260 of application server layer 254. Processes 114 and associated services 134 may be provided primarily using application server layer 254. Database layer 258 contains the actual physical data models 214, such as reference data model 214*d* and staging data model 214*e* described above with reference to FIG. 10, with associated data services provided either at database layer 258 or application server layer 254.

X. Example New Item Introduction Process

FIG. 13 illustrates an example new item introduction process 114 provided within MDM system 104. Although introduction of a new item entity for retail and associated vendor enterprises is described as an example, the present invention contemplates analogous or other introduction of any suitable new entity for any suitable enterprise, whether or not specifically described herein.

New item introduction is a very common and integral practice for dynamic value chain partners such as retailers and finished goods vendors. The frequency of new items being introduced to a retailer assortment may vary from one to one thousand each week, depending upon the retail segment and other factors. New item introduction may be the most important phase in the life cycle of an item. This process has traditionally been highly paper intensive and has impeded the ability of retailers and vendors to introduce items on a dynamic (i.e., day-to-day) basis, since there are thousands of variables, attributes, and other factors that may need to be considered in introducing a new item at the retailer shelf, from pricing to shelf-level execution. There is a business need for retailers to automate significant portions of the new item introduction process, and to streamline integration with planning, execution, monitoring, and other enterprise component solutions, to introduce new items with a shorter time-to-market, generate customer interest, and gain market share. In one embodiment, with new item introduction process 114, MDM system 104 incorporates an embedded business workflow for new item introduction that enables an example retail enterprise to introduce a new item more quickly, more easily, with more flexibility, and with more streamlined integration with planning, execution, monitoring, or other enterprise solution components 106 than with previous techniques.

A new item may be introduced in a number of different ways. For example, a vendor may introduce the new item to a retailer, a retailer may introduce the new item through item design (i.e., for private label), or a retailer and vendor may jointly decide to introduce the new item. Although there may be slight variations in these three methods of new item introduction, since this example will focus on the workflows internal to the retailer, this description will include details of new item introduction from a generic perspective. That is, the described workflows are generic in that they outline the processes that the retailer may go through, irrespective of whether the retailer introduces the new item, the vendor introduces the new item, or the retailer and vendor jointly introduce the new item. These workflows may also be applicable across all retailer formats (e.g., mass merchant, department store, etc.) and all merchandise segments (hardlines, grocery, softlines, etc.).

As illustrated in FIG. 13, in one embodiment there are two major aspects of new item introduction process 114: (1) a first sub-process 270 involving introduction, review, acceptance, and rejection of the new item, which may be analogized to the conception of a child; and (2) a second sub-process 272 involving creation of the new item within the retailer for initiating merchandising, replenishment, and supply chain planning and execution functions on the new item to make the new item available at the shelf for sale to the customer, which may be analogized to the birth of the child. First sub-process 270 may include, without limitation: a vendor introduction component 274 (where the vendor is introducing the new item), a retailer review component 276; a retailer rejection/modification component 278; a retailer approval component 280; and a vendor/retailer agreement finalization component 282. Second sub-process 272 may include a vendor/retailer keying component 284, in which the vendor or retailer creates one or more appropriate masters for the new item within database 136. Such masters may include, for example, an item master 286, an item-location master 288, and a vendor-item master 290. After creation and storage of masters for the new item according to execution of vendor/retailer keying component 284, legacy systems 292 and associated production databases 294 of the retailer or vendor may receive and recognize the new item for merchandising, replenishment, and supply chain planning and execution functions.

There may be many potential benefits of providing wholly or partially automated processes 114 for new item introduction, entry, creation, and maintenance. For example, automation of the new item introduction process may provide one or more of the following benefits, without limitation: (1) providing the retailer with the ability to merchandise and incorporate a new item into its assortments more quickly, thereby making the new item available to customers more quickly than its competitors; (2) as a result of a shorter time-to-market for new items, the retailer may considerably improve its chances of increasing sales and market share; (3) reduced labor costs and paper-flow within and across various retail functions; (4) reducing or eliminating the possibility of keying errors, thereby reducing the potential for human error; (5) providing tighter and more streamlined integration of the new item introduction process with planning, execution, monitoring, or other enterprise solution components 106, leading to better placement and replenishment of merchandise; and (6) efficiencies in planning and execution achieved through streamlined integration with new item introduction may be effectively leveraged to provide the lowest shelf-landed cost to the end-customer. With respect to tighter and more streamlined integration, examples may include, without limitation: (1) data from a vendor's quote associated with a new item may be automatically filled in for the retailer, no longer needing to be manually keyed in to finalize a contract with respect to the new item; (2) Universal Product Code (UPC) number may be automatically created for a new item once the new item has been created, no longer needing to be manually keyed in; (3) a retailer legacy system may be automatically checked to verify that a UPC number for a new item is associated with a retailer product number, no longer needing to be manually verified; and (4) in association with a merchandise planning system or other enterprise solution component 106, a product number for a new product may be automatically filled in for creation of a product assortment incorporating a new item, no longer needing to be manually keyed in.

New item introduction process 114 illustrated in FIG. 13 may be described in more detail, from introduction of the new item by the vendor through maintenance of the item by the retailer in its systems. In one embodiment, new item introduction, entry, creation, and maintenance associated with new item introduction process 114 within an example retailer may be broken down into the following primary sub-processes, without limitation: (1) an initiation sub-process; (2) a preliminary planning sub-process; (3) an item entry, approval, initial forecast estimation, and replenishment initiation sub-process; (4) an item setup, creation, activation, and initial replenishment sub-process; (5) an item merchandising and shelf execution setup sub-process; (6) an item forecast entry and replenishment sub-process; (7) an order management and collaboration sub-process; (8) inbound (vendor-to-retailer) and outbound (retailer-to-location) supply chain planning and execution sub-processes; (9) an item maintenance sub-process; and (10) an exceptions handling and management sub-process.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented method for optimizing inventory of a supply chain, comprising:
   generating, by a computer comprising one or more processing units and one or more memory units, an inventory plan for a supply chain, the supply chain comprising a plurality of buffers, the inventory plan describing an amount of inventory for each buffer of the plurality of buffers;
   generating, by the computer, a supply chain plan in accordance with the inventory plan;
   initiating, by the computer, execution of the supply chain plan at the supply chain;
   monitoring, by the computer, the supply chain to generate supply chain data, the supply chain data comprising a plurality of metric values describing the supply chain;
   detecting, by the computer, a watchpoint triggered by a metric value of the plurality of metric values;
   identifying, by the computer, one or more causes of the triggered watchpoint using a causal tree, the causal tree identifying at least one possible cause of unanticipated variability in the metric value;
   adjusting, by the computer, the inventory plan in response to the detected triggered watchpoint and in accordance with the one or more identified causes;
   adjusting, by the computer, the supply chain plan in accordance with the adjusted inventory plan;
   initiating, by the computer, execution of the adjusted supply chain plan;
   measuring, by the computer, the plurality of metric values in response to the execution of the adjusted supply chain plan; and
   updating, by the computer, the causal tree in response to the measured plurality of metric values.

2. The method of claim 1, wherein the inventory plan comprises an optimized inventory plan describing an optimized amount of inventory for each buffer of the plurality of buffers.

3. The method of claim 1, wherein adjusting the inventory plan in response to the detected triggered watchpoint further comprises:
   generating a plurality of scenarios of the supply chain, each scenario associated with one or more parameter values of the supply chain;
   determining an outcome for each scenario of the plurality of scenarios;
   evaluating the outcomes;
   selecting an outcome in accordance-with the evaluation;
   identifying the scenario of the selected outcome; and
   adjusting the inventory plan in accordance with the one or more parameter values of the identified scenario.

4. The method of claim 1, further comprising selecting a set of policy parameters by:
   generating a plurality of policy group scenarios, each policy group scenario of the plurality of policy group scenarios corresponding to a set of policy parameters;
   evaluating the scenarios;
   selecting a policy group scenario in accordance with the evaluation; and
   selecting the set of policy parameters corresponding to the selected policy group scenario.

5. The method of claim 1, wherein detecting the watchpoint triggered by the metric value of the plurality of metric values further comprises:
   determining whether the triggering metric value is within an anticipated variability; and
   adjusting the inventory plan when the triggering metric value is outside of the anticipated variability.

6. The method of claim 1, further comprising storing the supply chain data at a master data management database for centrally managing core enterprise reference data associated with an enterprise.

7. The method of claim 1, further comprising storing the supply chain data at a master data management system for centrally managing core enterprise reference data associated with an enterprise, the master data management system comprising:
   a centralized master repository containing the core enterprise reference data;
   an internal services framework coupled with the centralized master repository and providing internal services for managing the core enterprise reference data within the centralized master repository; and
   an infrastructure services layer coupled with the centralized master repository and providing bulk data transfer between the centralized master repository and one or more external operational systems according to one or more enterprise-level business workflows.

8. A system for optimizing inventory of a supply chain, comprising:
   a database and memory to store information describing a supply chain comprising a plurality of buffers; and one or more applications tangibly embodied on computer-readable medium configured to:
generate an inventory plan for the supply chain, the inventory plan describing an amount of inventory for each buffer of the plurality of buffers;
generate a supply chain plan in accordance with the inventory plan;
initiate execution of the supply chain plan at the supply chain;
monitor execution of the supply chain to generate supply chain data, the supply chain data comprising a plurality of metric values describing the supply chain;
detect a watchpoint triggered by a metric value of the plurality of metric values;
identify one or more causes of the triggered watchpoint using a causal tree, the causal tree identifying at least one possible cause of unanticipated variability in the metric value;
adjust the inventory plan in response to the detected triggered watchpoint and in accordance with the one or more identified causes;
adjust the supply chain plan in accordance with the adjusted inventory plan;
initiate execution of the adjusted supply chain plan;
measure the plurality of metric values in response to the execution of the adjusted supply chain plan; and
update the causal tree in response to the measured plurality of metric values.

9. The system of claim 8, wherein the inventory plan comprises an optimized inventory plan describing an optimized amount of inventory for each buffer of the plurality of buffers.

10. The system of claim 8, wherein the one or more applications are further configured to adjust the inventory plan in response to the detected triggered watchpoint by:
generating a plurality of scenarios of the supply chain, each scenario associated with a one or more parameter values of the supply chain;
determining an outcome for each scenario of the plurality of scenarios;
evaluating the outcomes;
selecting an outcome in accordance with the evaluation;
identifying the scenario of the selected outcome; and
adjusting the inventory plan in accordance with the one or more parameter values of the identified scenario.

11. The system of claim 8, wherein the one or more applications are further configured to select a set of policy parameters by:
generating a plurality of policy group scenarios, each policy group scenario of the plurality of policy group scenarios corresponding to a set of policy parameters;
evaluating the scenarios;
selecting a policy group scenario in accordance with the evaluation; and
selecting the set of policy parameters corresponding to the selected policy group scenario.

12. The system of claim 8, wherein the one or more applications are further configured to detect the watchpoint triggered by the metric value of the plurality of metric values by:
determining whether the triggering metric value is within an anticipated variability; and
adjusting the inventory plan when the triggering metric value is outside of the anticipated variability.

13. The system of claim 8, wherein the one or more applications are further configured to store the supply chain data at a master data management database for centrally managing core enterprise reference data associated with an enterprise.

14. The system of claim 8; wherein the one or more applications are further configured to store the supply chain data at a master data management system for centrally managing core enterprise reference data associated with an enterprise, the master data management system comprising:
a centralized master repository containing the core enterprise reference data;
an internal services framework coupled with the centralized master repository and providing internal services for managing the core enterprise reference data within the centralized master repository; and
an infrastructure services layer coupled with the centralized master repository and providing bulk data transfer between the centralized master repository and one or more external operational systems according to one or more enterprise-level business workflows.

15. A computer-readable non transitory storage medium embodied with software for optimizing inventory of a supply chain, the software when executed by a computer system is configured to:
generate an inventory plan for a supply chain, the supply chain comprising a plurality of buffers, the inventory plan describing an amount of inventory for each buffer of the plurality of buffers;
generate a supply chain plan in accordance with the inventory plan;
initiate execution of the supply chain plan at the supply chain;
monitor the supply chain to generate supply chain data, the supply chain data comprising a plurality of metric values describing the supply chain;
detect a watchpoint triggered by a metric value of the plurality of metric values;
identify one or more causes of the triggered watchpoint using a causal tree, the causal tree identifying at least one possible cause of unanticipated variability in the metric value;
adjust the inventory plan in response to the detected triggered watchpoint and in accordance with the one or more identified causes;
adjust the supply chain plan in accordance with the adjusted inventory plan;
initiate execution of the adjusted supply chain plan;
measure the plurality of metric values in response to the execution of the adjusted supply chain plan; and
update the causal tree in response to the measured plurality of metric values.

16. The computer-readable storage medium of claim 15, wherein the inventory plan comprises an optimized inventory plan describing an optimized amount of inventory for each buffer of the plurality of buffers.

17. The computer-readable storage medium of claim 15, further configured to adjust the inventory plan in response to the detected triggered watchpoint by:
generating a plurality of scenarios of the supply chain, each scenario associated with a one or more parameter values of the supply chain;
determining an outcome for each scenario of the plurality of scenarios;
evaluating the outcomes;
selecting an outcome in accordance with the evaluation;
identifying the scenario of the selected outcome; and
adjusting the inventory plan in accordance with the one or more parameter values of the identified scenario.

18. The computer-readable storage medium of claim 15, further configured to select a set of policy parameters by:
  generating a plurality of policy group scenarios, each policy group scenario of the plurality of policy group scenarios corresponding to a set of policy parameters;
  evaluating the scenarios;
  selecting a policy group scenario in accordance with the evaluation; and
  selecting the set of policy parameters corresponding to the selected policy group scenario.

19. The computer-readable storage medium of claim 15, further configured to detect the watchpoint triggered by the metric value of the plurality of metric values by:
  determining whether the triggering metric value is within an anticipated variability; and
  adjusting the inventory plan when the triggering metric value is outside of the anticipated variability.

20. The computer-readable storage medium of claim 15, further configured to store the supply chain data at a master data management database for centrally managing core enterprise reference data associated with an enterprise.

21. The computer-readable storage medium of claim 15, further configured to store the supply chain data at a master data management system for centrally managing core enterprise reference data associated with an enterprise, the master data management system comprising:
  a centralized master repository containing the core enterprise reference data;
  an internal services framework coupled with the centralized master repository and providing internal services for managing the core enterprise reference data within the centralized master repository; and
  an infrastructure services layer coupled with the centralized master repository and providing bulk data transfer between the centralized master repository and one or more external operational systems according to one or more enterprise-level business workflows.

22. A system for optimizing inventory of a supply chain, comprising:
  means for generating an inventory plan for a supply chain, the supply chain comprising a plurality of buffers, the inventory plan describing an amount of inventory for each buffer of the plurality of buffers;
  means for generating a supply chain plan in accordance with the inventory plan;
  means for initiating execution of the supply chain plan at the supply chain;
  means for monitoring the supply chain to generate supply chain data, the supply chain data comprising a plurality of metric values describing the supply chain;
  means for detecting a watchpoint triggered by a metric value of the plurality of metric values;
  means for identifying one or more causes of the triggered watchpoint using a causal tree, the causal tree identifying at least one possible cause of unanticipated variability in the metric value;
  means for adjusting the inventory plan in response to the detected triggered watchpoint and in accordance with the one or more identified causes;
  means for adjusting the supply chain plan in accordance with the adjusted inventory plan;
  means for initiating execution of the adjusted supply chain plan;
  means for measuring the plurality of metric values in response to the execution of the adjusted supply chain plan; and
  means for updating the causal tree in response to the measured plurality of metric values.

23. A computer-implemented method for optimizing inventory of a supply chain, comprising:
  generating, by a computer comprising one or more processing units and one or more memory units, an inventory plan for a supply chain, the supply chain comprising a plurality of buffers, the inventory plan describing an amount of inventory for each buffer of the plurality of buffers, the inventory plan comprising an optimized inventory plan describing an optimized amount of inventory for each buffer of the plurality of buffers;
  generating, by the computer, a supply chain plan in accordance with the inventory plan;
  initiating, by the computer, execution of the supply chain plan at the supply chain;
  monitoring, by the computer, the supply chain to generate supply chain data, the supply chain data comprising a plurality of metric values describing the supply chain;
  storing, by the computer, the supply chain data at a master data management system for centrally managing core enterprise reference data associated with an enterprise, the master data management system comprising:
    a centralized master repository containing the core enterprise reference data;
    an internal services framework coupled with the centralized master repository and providing internal services for managing the core enterprise reference data within the centralized master repository; and
    an infrastructure services layer coupled with the centralized master repository and providing bulk data transfer between the centralized master repository and one or more external operational systems according to one or more enterprise-level business workflows;
  detecting, by the computer, a watchpoint triggered by a metric value of the plurality of metric values by determining whether the triggering metric value is within an anticipated variability; and
  adjusting, by the computer, the inventory plan in response to the detected triggered watchpoint when the triggering metric value is outside of the anticipated variability, the inventory plan adjusted by:
    identifying one or more causes of the triggered watchpoint using a causal tree, the causal tree identifying at least one possible cause of unanticipated variability in the metric value; and
    adjusting the inventory plan in accordance with the one or more identified causes, the inventory plan further adjusted by:
      generating a plurality of scenarios of the supply chain, each scenario associated with a one or more parameter values of the supply chain;
      determining an outcome for each scenario of the plurality of scenarios;
      evaluating the outcomes;
      selecting an outcome in accordance with the evaluation;
      identifying the scenario of the selected outcome; and
      adjusting the inventory plan in accordance with the one or more parameter values of the identified scenario;
  adjusting, by the computer, the supply chain plan in accordance with the adjusted inventory plan;
  initiating, by the computer, execution of the adjusted supply chain plan; and selecting, by the computer, a set of policy parameters by:
   generating a plurality of policy group scenarios, each policy group scenario of the plurality of policy group scenarios corresponding to a set of policy parameters;
   evaluating the scenarios;
   selecting a policy group scenario in accordance with the evaluation; and
   selecting the set of policy parameters corresponding to the selected policy group scenario.

* * * * *